US010643097B2

(12) United States Patent
Kobayashi et al.

(10) Patent No.: US 10,643,097 B2
(45) Date of Patent: May 5, 2020

(54) IMAGE PROCESSING APPARATUSES AND NON-TRANSITORY COMPUTER READABLE MEDIUM

(71) Applicant: FUJI XEROX CO., LTD., Tokyo (JP)

(72) Inventors: Kunihiko Kobayashi, Kanagawa (JP); Kazuhiro Oya, Kanagawa (JP); Shigeru Okada, Kanagawa (JP); Shintaro Adachi, Kanagawa (JP); Hiroyuki Kishimoto, Kanagawa (JP); Akane Abe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/689,365

(22) Filed: Aug. 29, 2017

(65) Prior Publication Data

US 2018/0225541 A1  Aug. 9, 2018

(30) Foreign Application Priority Data

Feb. 8, 2017 (JP) .................. 2017-021136

(51) Int. Cl.
| G06K 9/00 | (2006.01) |
|---|---|
| G06K 9/46 | (2006.01) |
| H04N 1/387 | (2006.01) |
| G06K 9/32 | (2006.01) |
| H04N 1/393 | (2006.01) |

(52) U.S. Cl.
CPC ....... G06K 9/4633 (2013.01); G06K 9/00442 (2013.01); G06K 9/3275 (2013.01); H04N 1/3873 (2013.01); H04N 1/3875 (2013.01); H04N 1/3876 (2013.01); G06K 9/4642 (2013.01); H04N 1/393 (2013.01)

(58) Field of Classification Search
None
See application file for complete search history.

(56) References Cited

U.S. PATENT DOCUMENTS

| 6,373,590 B1 * | 4/2002 | Ancin ................. H04N 1/3876 |
|---|---|---|
| | | 358/1.18 |
| 6,898,316 B2 * | 5/2005 | Zhou .................... H04N 1/3872 |
| | | 358/450 |
| 7,305,129 B2 * | 12/2007 | Chellapilla ........... G06F 17/243 |
| | | 382/174 |
| 7,623,734 B2 * | 11/2009 | Herley ...................... G06T 7/12 |
| | | 345/441 |
| 7,805,003 B1 * | 9/2010 | Cohen ................ G06K 9/00463 |
| | | 382/103 |
| 8,149,478 B2 * | 4/2012 | Onishi ................. H04N 1/3873 |
| | | 358/449 |
| 8,155,443 B2 | 4/2012 | Fukunaga |
| 8,688,579 B1 * | 4/2014 | Ethington .......... G06Q 20/0425 |
| | | 705/42 |
| 9,179,035 B2 * | 11/2015 | Kurilin ................ H04N 1/3878 |
| 2008/0100885 A1 | 5/2008 | Onishi |

FOREIGN PATENT DOCUMENTS

| JP | 2008-016700 A | 1/2008 |
|---|---|---|
| JP | 2008-113075 A | 5/2008 |
| JP | 2009-252115 A | 10/2009 |

* cited by examiner

*Primary Examiner* — Soo Jin Park

(74) *Attorney, Agent, or Firm* — Oliff PLC

(57) ABSTRACT

An image processing apparatus includes a generation unit that generates, in a case where a small-sheet image in a first image is unsuccessfully extracted and results in multiple small-sheet images, a second image including the small-sheet images that are combined.

7 Claims, 17 Drawing Sheets

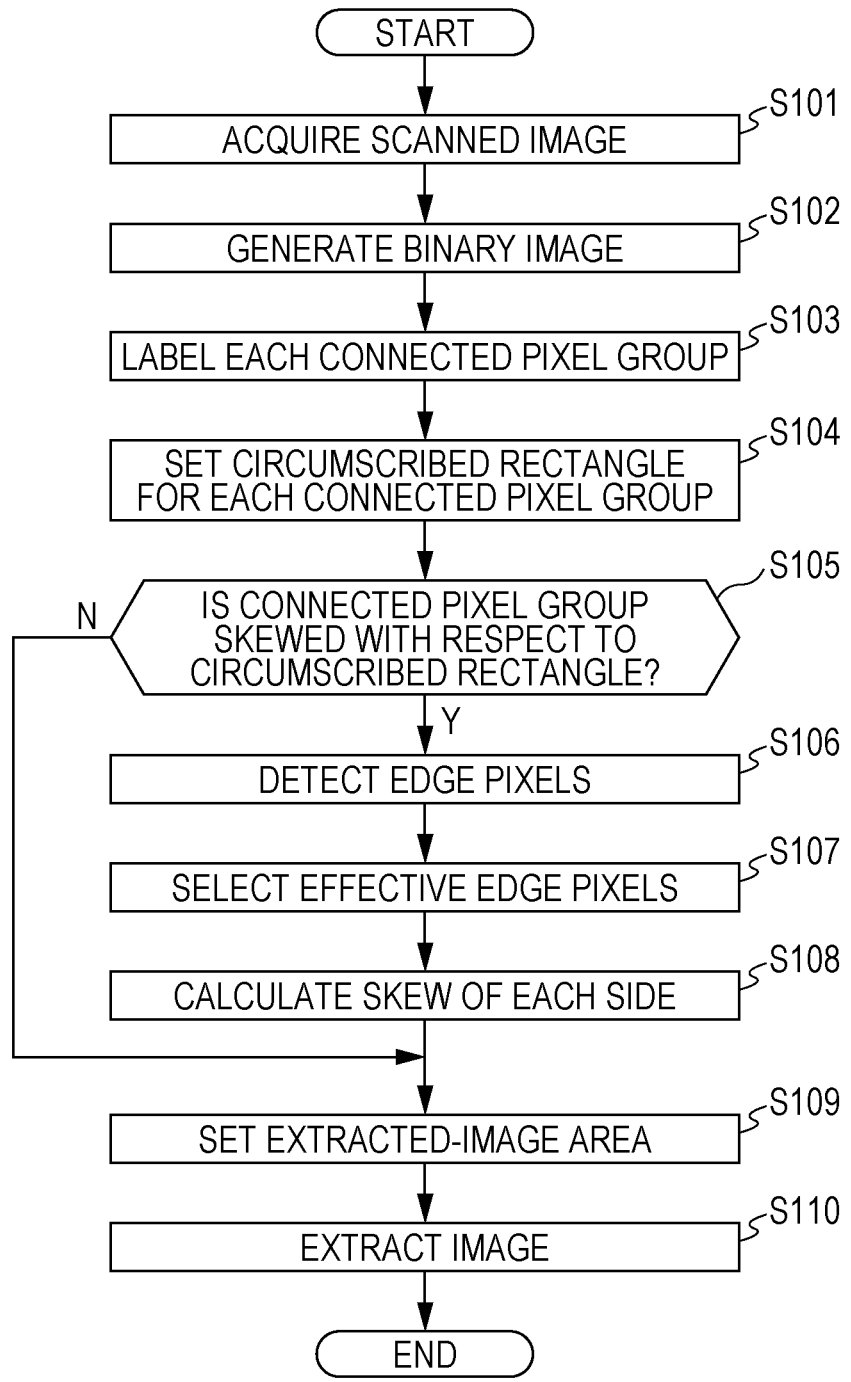

FIG. 13

| 1310 | 1320 | 1330 | 1340 | 1350 |
|---|---|---|---|---|
| ID | x | y | w | h |
|  |  |  |  |  |

1300

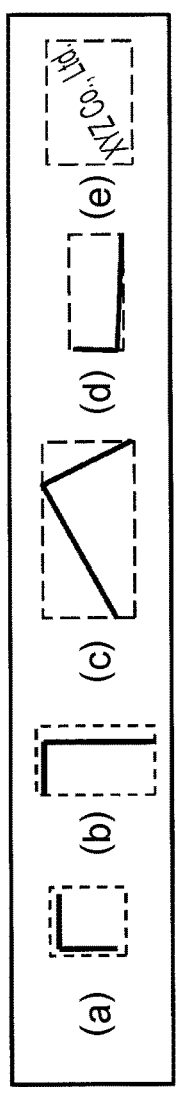
FIG. 14C1
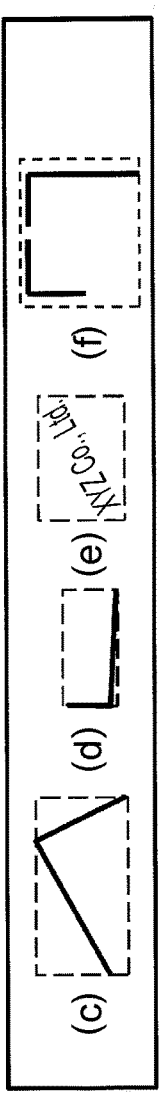
FIG. 14C2
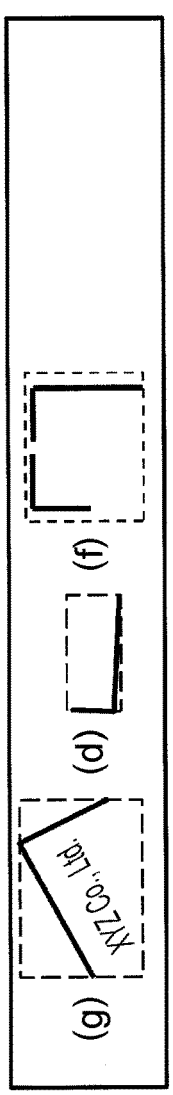
FIG. 14C3
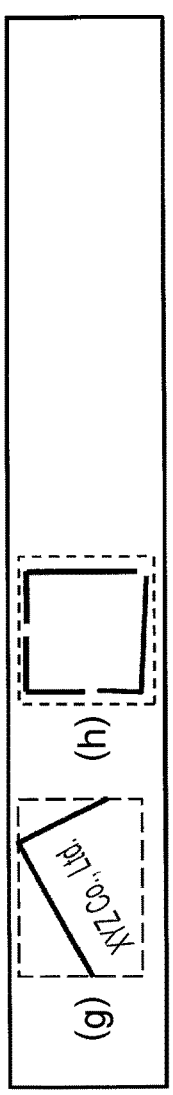
FIG. 14C4
FIG. 14D1  FIG. 14D2  FIG. 14D3
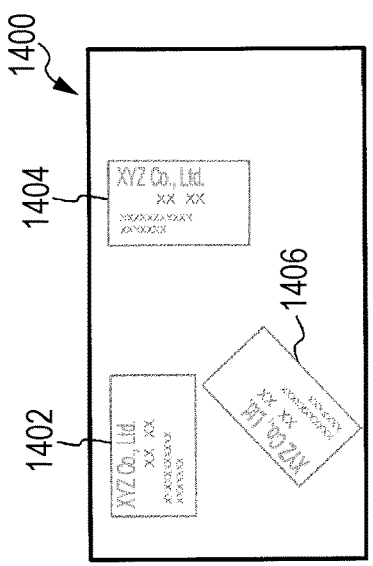
FIG. 14A
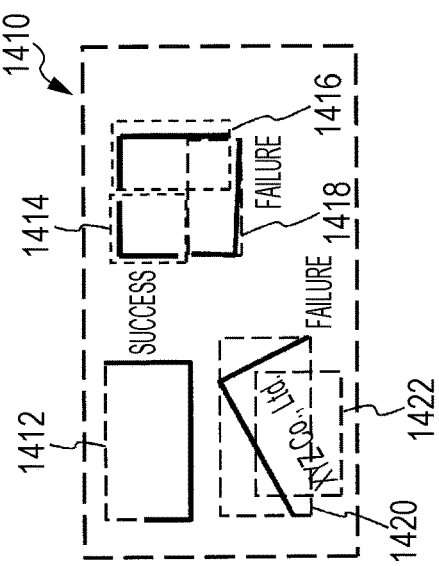
FIG. 14B

IMAGE PROCESSING APPARATUSES AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-021136 filed Feb. 8, 2017.

BACKGROUND

(i) Technical Field

The present invention relates to image processing apparatuses and a non-transitory computer readable medium.

(ii) Related Art

Generation of an image has been performed in such a manner that multiple small sheets such as name cards are read, and extraction of corresponding small-sheet images from the generated image has been performed. However, the small-sheet images are not necessarily extracted properly, and a user thus needs to check an extraction result. For example, multiple small-sheet images that have originally constituted one small-sheet image are extracted in some cases. In such cases, the wrongly extracted small-sheet images are not easily associated with the original small sheet. When the user checks the result, it is thus difficult to determine which small sheet has an error.

SUMMARY

According to an aspect of the invention, there is provided an image processing apparatus including a generation unit that generates, in a case where a small-sheet image in a first image is unsuccessfully extracted and results in multiple small-sheet images, a second image including the small-sheet images that are combined.

BRIEF DESCRIPTION OF THE DRAWINGS

Exemplary embodiments of the present invention will be described in detail based on the following figures, wherein:

FIG. 8 is a flowchart illustrating an example process executed by the image-separation processing module;

FIG. 13 is an explanatory table illustrating a data structure example of a list;

FIGS. 14A, 14B, 14C1, 14C2, 14C3, 14C4, 14D1, 14D2, and 14D3 are explanatory diagrams illustrating the example of the process according to the first exemplary embodiment;

DETAILED DESCRIPTION

First Exemplary Embodiment

Hereinafter, an example of an exemplary embodiment to implement the invention will be described with reference to the drawings.

Figure 1:
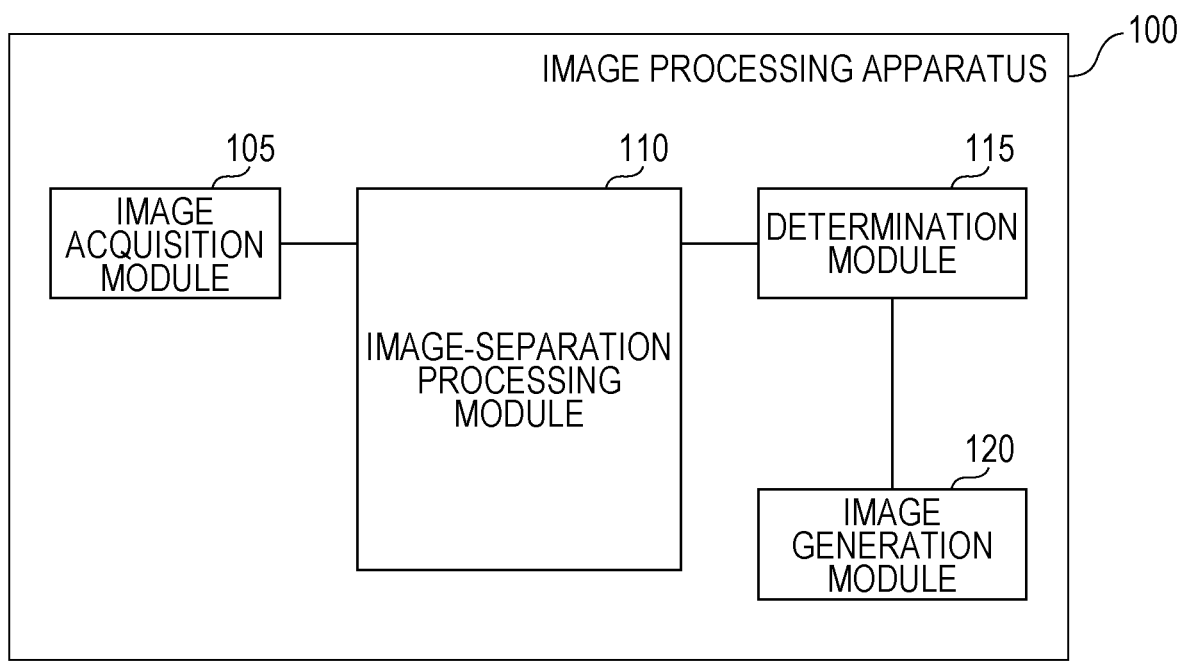
FIG. 1 is a diagram of an example configuration of conceptual modules of a first exemplary embodiment.

FIG. 1 illustrates an example configuration of conceptual modules of a first exemplary embodiment.

Note that the term "module" refers to generally logically separable components of software (computer programs) and hardware or the like. Modules in the exemplary embodiment thus refer to not only modules in a computer program but also modules in a hardware configuration. Accordingly, the description of the exemplary embodiment also serves as a description of a computer program for causing a computer to function as the modules (a program for causing a computer to execute steps, a program for causing a computer to function as components, and a program for causing a computer to implement functions) as well as a system and a method therefor. Meanwhile, the term "to store" and other terms equivalent to "to store" are used in descriptions. In a case where the exemplary embodiment describes a computer program, the term means storing something in a storage device or controlling something so as to store something in a storage device. The modules are provided for respective functions on a one-to-one basis. However, in implementing the functions, one program may constitute one module; one program may constitute multiple modules; and multiple programs may constitute one module. In addition, one computer may run multiple modules, and multiple computers may run one module in a distributed or parallel processing environment. Note that one module may include another module. Moreover, the term "connection" is used for not only a physical connection but also a logical connection (such as data exchange, instructions, or a reference relationship among data pieces). The term "predetermined" refers to having been determined before target processing. This term is used in such a manner as to include the meaning of being determined according to the situation at the determination time or to the situation thus far only before target processing, regardless of whether before or even after the start of processing in the exemplary embodiment. Meanwhile, in a case of multiple "predetermined values", the values may be different from one another, or two or more of the values may be the same (including all of the values). Moreover, an expression meaning "if A, then B" is used in such a manner as to mean that "it is determined whether A holds true, and if it is determined that A holds true, then B is performed". However, this excludes a case where the determination of whether A holds true is not needed.

A system or a device includes not only a configuration in which multiple computers, hardware, devices, and the like are connected to each other through a communication unit such as a network (including a communication connection on a one-to-one basis), but also a configuration in which a computer, hardware, a device, or the like is implemented. The terms "device" and "system" are used as terms having the same meaning. It goes without saying that the "system" does not include a mere social "system" built in accordance with agreements worked out by humans.

In addition, to perform a processing operation or multiple processing operations in each module, the module reads target information from a storage device for each processing, performs the processing, and writes a processing result to the storage device. Accordingly, explanations of reading the content from the storage device before processing and writing the content to the storage device after the processing are omitted in some cases. Here, the storage device may include a hard disk, a random access memory (RAM), an external storage medium, a storage device connected through a communication network, a register in a CPU, and other devices.

An image processing apparatus 100 that is the first exemplary embodiment extracts a small-sheet image from an image and includes an image acquisition module 105, an image-separation processing module 110, a determination module 115, and an image generation module 120 as illustrated in the example in FIG. 1.

A small sheet denotes a document of a size to such a degree that multiple sheets are enabled to be scanned in one go. Examples of the small sheet include a document such as a name card, a card such as a credit card, a receipt, and a letter. Hereinafter, a name card is taken as an example in the description.

The term "image" used in the phrase "extracts a small-sheet image from an image" denotes an image read when scanning is performed one time with a small sheet being placed on, for example, the document table (also referred to as a platen) of a scanner. Specifically, if multiple small sheets are placed, the number of scanning times is reduced compared with a case where one small sheet is read every time scanning is performed. However, in exemplary embodiments (the first exemplary embodiment and a second exemplary embodiment), one small sheet in the image instead of multiple small sheets may be processed. In addition, although a scanner is taken as an example, an image captured with a digital camera or the like may be processed.

The image acquisition module 105 is connected to the image-separation processing module 110. The image acquisition module 105 acquires an image and delivers the image to the image-separation processing module 110. Acquiring an image includes, for example, reading an image with a scanner, a digital camera, or another apparatus, receiving an image from an external apparatus with a fax machine via a communication network, and reading an image stored in a hard disk (including a hard disk built in a computer, a hard disk connected to a computer via a network, and other hard disks). The image may be a binary image or a multivalued image (including a color image). One image or multiple images may be received. The image contains one or more small-sheet images.

The image-separation processing module 110 is connected to the image acquisition module 105 and the determination module 115. The image-separation processing module 110 separates the small-sheet images from each other on the basis of the image acquired by the image acquisition module 105. The details of a separation process will be described later by using the examples in FIGS. 2 to 8.

The determination module 115 is connected to the image-separation processing module 110 and the image generation module 120. In a case where a circumscribed rectangle in the image acquired by the image acquisition module 105 does not indicate a small-sheet image, the determination module 115 regards the case as a case where a small-sheet image in the image is unsuccessfully extracted. The phrase "a case where a circumscribed rectangle does not indicate a small-sheet image" specifically denotes "a case where a circumscribed rectangle does not contain a whole small-sheet image". Since the small-sheet image is skewed in some cases, the four sides of the circumscribed rectangle do not necessarily have to correspond to the four sides of the small-sheet image.

In accordance with the size of the circumscribed rectangle or the number of detected sides of the small-sheet image in the circumscribed rectangle, the determination module 115 determines whether the circumscribed rectangle indicates the small-sheet image. Specifically, if the size of the circumscribed rectangle is within a predetermined range, or if the number of sides of the small-sheet image is larger than or not smaller than a predetermined number, the determination module 115 may determine that the circumscribed rectangle indicates the small-sheet image. It goes without saying that if the two conditions ((1) the size of the circumscribed rectangle is within the predetermined range and (2) the number of sides of the small-sheet image is larger than or not smaller than the predetermined number) are satisfied, the determination module 115 may determine that the circumscribed rectangle indicates the small-sheet image.

The image generation module 120 is connected to the determination module 115. In a case where a small-sheet image in the image is unsuccessfully extracted and results in multiple small-sheet images, the image generation module 120 generates an image including the small-sheet images that are combined. Note that, for example, a result of determination performed by the determination module 115 may be used to determine "a case where a small-sheet image in the image is unsuccessfully extracted".

For example, if a distance between the small-sheet images is shorter than or not longer than a threshold, the image generation module 120 may combine the small-sheet images. Note that "a distance between the small-sheet images" may be, for example, a distance between predetermined locations of the small-sheet images (such as the centers, the centers of gravity, or upper left corners), the shortest (or longest) distance between the small-sheet images, or another distance.

The threshold may be any one of (1) a predetermined value, (2) a value set in accordance with a small sheet type, and (3) a value set in accordance with the size of a successfully extracted small-sheet image. Examples of "a small sheet type" include a name card, a card, and a receipt, as described above. The type may be a predetermined type or a type designated through an operation performed by an operator. As (2) a value set in accordance with a small sheet type, a threshold predetermined on a per-type basis is used. In addition, regarding "a successfully extracted small-sheet image", an image generally includes multiple small-sheet images and is thus likely to include a successfully extracted small-sheet image. Accordingly, a threshold is used in accordance with the size of the successfully extracted small-sheet image. Generally, the larger the size of the small sheet, the larger the threshold.

Figure 2:
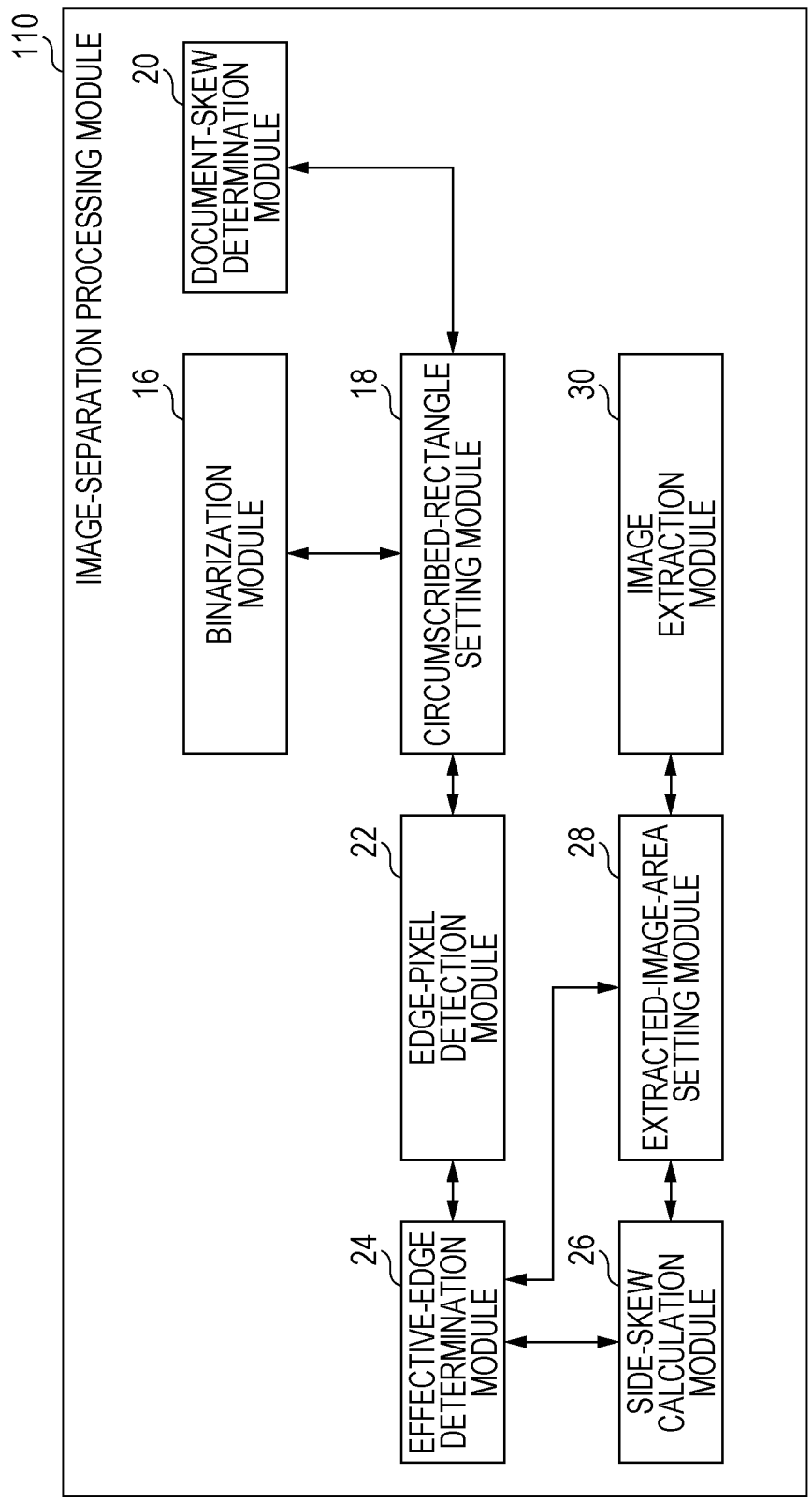
FIG. 2 is a diagram of an example configuration of conceptual modules of an image-separation processing module.

FIG. 2 is a diagram of an example configuration of conceptual modules of the image-separation processing module 110. Hereinafter, the details of the functions of the image-separation processing module 110 will be described.

As illustrated in the example in FIG. 2, the image-separation processing module 110 includes a binarization module 16, a circumscribed-rectangle setting module 18, a document-skew determination module 20, an edge-pixel detection module 22, an effective-edge determination module 24, a side-skew calculation module 26, an extracted-image-area setting module 28, and an image extraction module 30.

The binarization module 16 executes a binarizing process on a scanned image acquired by the image acquisition module 105 and generates a binary image of the target image. For example, the binarization module 16 executes the binarizing process in which the edge of the image is enhanced and thereby facilitates extraction of outline portions of small sheets included in the image. It goes without saying that if the image acquired by the image acquisition module 105 is a binary image, the binarization module 16 delivers the image to the circumscribed-rectangle setting module 18 without executing any process.

The circumscribed-rectangle setting module 18 labels (executes a labelling process on) each of connected pixel group composed of black pixels included in the binary image generated by the binarization module 16 and sets a circumscribed rectangle for the corresponding labelled connected pixel group. Hereinafter, a process executed by the circumscribed-rectangle setting module 18 will be specifically described with reference to FIG. 3.

Figure 3:
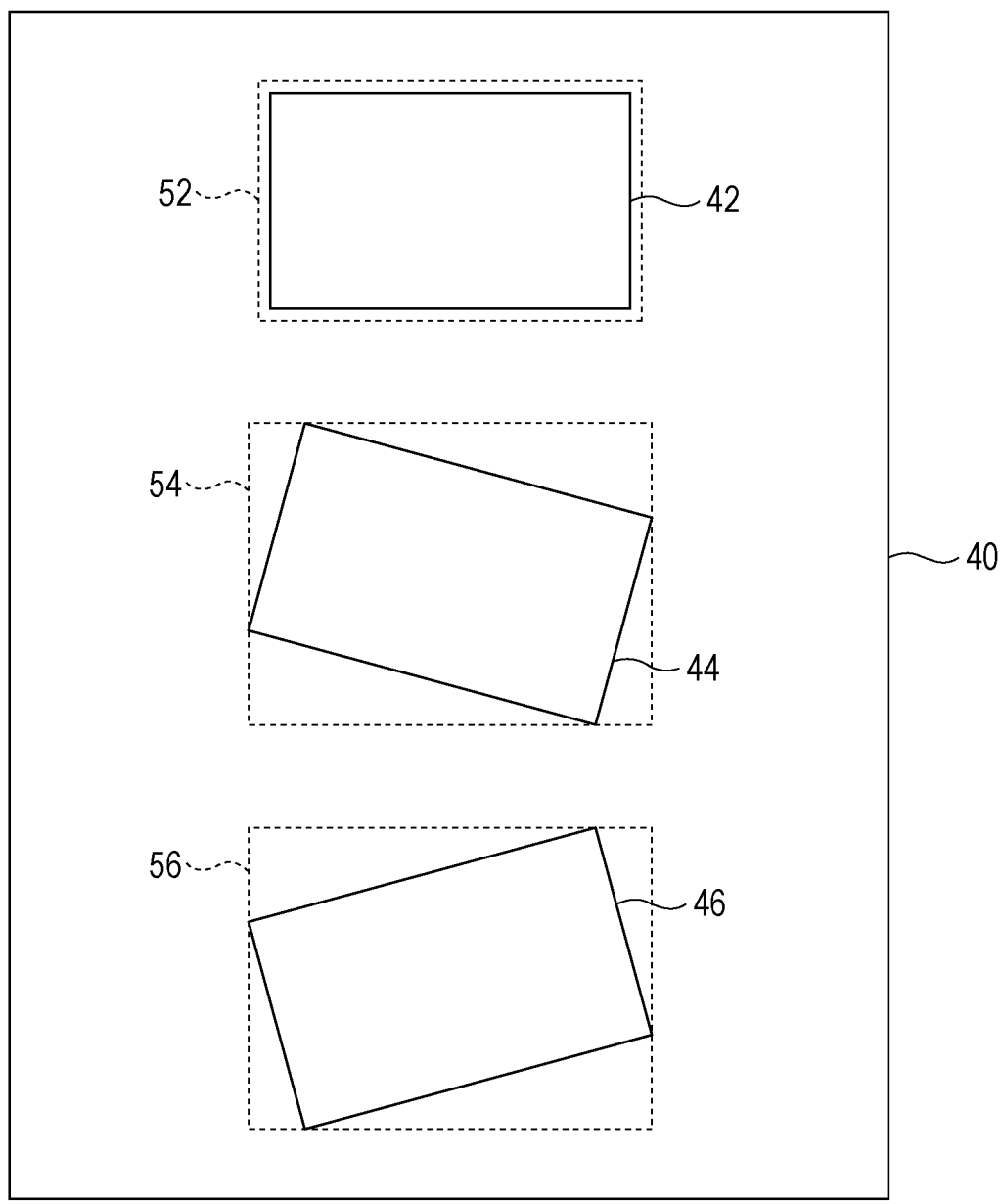
FIG. 3 is a diagram illustrating examples of circumscribed rectangles respectively set for connected pixel groups included in a binary image.

FIG. 3 illustrates an example of circumscribed rectangles set for connected pixel groups included in a binary image in the process executed by the circumscribed-rectangle setting module 18. The example in FIG. 3 illustrates three small-sheet images included in a binary image 40. The circumscribed-rectangle setting module 18 respectively sets circumscribed rectangles 52, 54, and 56 for connected pixel groups 42, 44, and 46 indicating the outline edges of the small-sheet images included in the binary image 40. Note that each connected pixel group includes at least one pixel area composed of four or eight continuously connected pixels and may also include a set of the pixel areas. The term "a set of the pixel areas" denotes multiple pixel areas composed of four continuously connected pixels or the like and adjacent to each other. The term "adjacent to each other" denotes, for example, "close to each other (a distance shorter than or not longer than a predetermined distance).

The document-skew determination module 20 determines whether each connected pixel group (small-sheet image) included in the area of the corresponding circumscribed rectangle set for the connected pixel group by the circumscribed-rectangle setting module 18 is skewed with respect to the circumscribed rectangle. If the document-skew determination module 20 determines that the small-sheet image is not skewed with respect to the circumscribed rectangle, the area of the circumscribed rectangle may be set as an image area including the small-sheet image. If the document-skew determination module 20 determines that the small-sheet image is skewed with respect to the circumscribed rectangle, the outline portion of the small-sheet image is detected in the circumscribed rectangle, and an area having the outline of the small-sheet image is set as an extracted-image area of the small-sheet image, as described below. The details of the process for setting the extracted-image area of the skewed small-sheet image will be described later.

Figure 4:
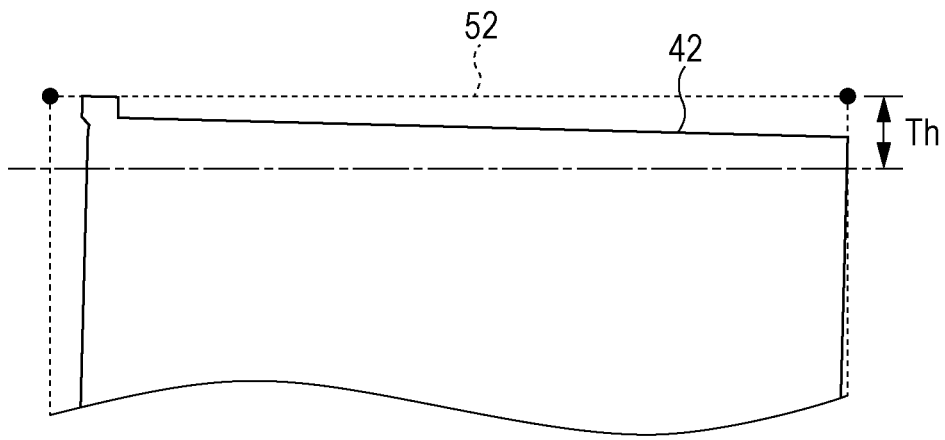
FIG. 4 is a diagram explaining an example of a criterion for determining whether a small-sheet image is skewed.

An example of a criterion for determining whether a small-sheet image is skewed will be described with reference to FIG. 4, the criterion being used by the document-skew determination module 20. As illustrated in FIG. 4, if each of sides that is formed by a corresponding part of the connected pixel group 42 and that is close to one of the sides of a circumscribed rectangle 52 is located within a predetermined distance (Th) from the side of the circumscribed rectangle 52, the document-skew determination module 20 determines that a small-sheet image included in the circumscribed rectangle is not skewed. If the small-sheet image does not satisfy the criterion, the document-skew determination module 20 determines that the small-sheet image is skewed in the image. The value of the aforementioned distance Th may be predetermined on a per side-length basis.

In accordance with a rule (described below), the edge-pixel detection module 22 detects the edge pixels of each small-sheet image from the corresponding image area of the circumscribed rectangle set by the circumscribed-rectangle setting module 18. Specifically, the edge-pixel detection module 22 first selects one of the sides of the circumscribed rectangle as a processing target. The edge-pixel detection module 22 then performs scanning operations in a direction perpendicular to the side including vertexes of the circumscribed rectangle and a point of contact with a connected pixel group. The edge-pixel detection module 22 performs the scanning operations one by one from each of multiple points on a line extending from the point of contact to one of the vertexes farther from the point of contact. The edge-pixel detection module 22 detects, as an edge pixel, a pixel detected first. The multiple points may be set, for example, on the basis of pixels on the line or at predetermined intervals.

Figure 5:
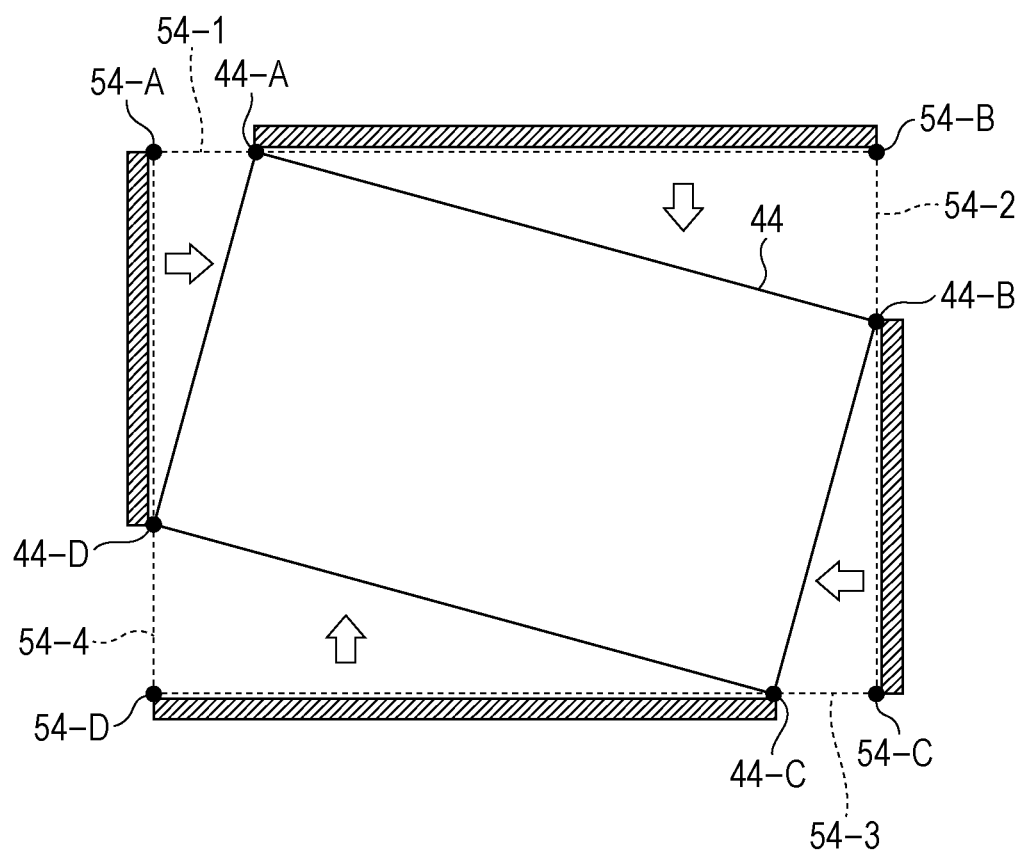
FIG. 5 is a diagram illustrating examples of a connected pixel group and a circumscribed rectangle.

FIG. 5 is a diagram illustrating examples of a connected pixel group and a circumscribed rectangle. The process executed by the edge-pixel detection module 22 will be specifically described with reference to the example in FIG. 5. First, the edge-pixel detection module 22 executes the following process on a top side 54-1 of a circumscribed rectangle 54. The process is repeated from a point of contact 44-A, as a start point, in contact with the connected pixel group 44 to one of vertexes that is farther from the point of contact 44-A, that is, a vertex 54-B. First, the edge-pixel detection module 22 records the position coordinates of a point, on the top side 54-1, in contact with the point of contact 44-A serving as the start point. The edge-pixel detection module 22 shifts the point to a point a predetermined number of pixels (for example, one pixel) away from the point of contact 44-A toward the vertex 54-B and then performs a scanning operation in the direction perpendicular to the top side 54-1 from the point. The edge-pixel detection module 22 detects a black pixel and records the position coordinates of the detected black pixel. The black pixel thus detected is regarded as an edge pixel. The edge-pixel detection module 22 repeats the process from the point of contact 44-A to the vertex 54-B. The edge-pixel detection module 22 executes the same process also on sides 54-2, 54-3, and 54-4 and acquires the position coordinates of the edge pixels for the sides. Note that since a scanned image might have noise, the detected edge pixels do not necessarily constitute the outline portion of the small-sheet image. Hence, a function described below may be provided to select edge pixels that have a high probability of constituting the outline portion. This enhances the accuracy in extracting a small-sheet image.

The effective-edge determination module 24 determines whether each edge pixel detected by the edge-pixel detection module 22 is a pixel located in the outline portion of the small-sheet image. An edge pixel determined to be located in the outline portion of the small-sheet image by the effective-edge determination module 24 is regarded as an effective edge pixel. The effective-edge determination module 24 determines that an edge pixel satisfying any one of the following three criteria is not located in the outline portion of the small-sheet image, that is, determines that the edge pixel is not an effective edge pixel. The effective-edge determination module 24 determines that an edge pixel not satisfying any one of the criteria is an effective edge pixel.

The first criterion is that if an edge pixel is detected at a point farther from a side, of the circumscribed rectangle, including the scanning start point than any of the diagonal lines of the circumscribed rectangle, the edge pixel is not regarded as an effective edge pixel. This is because if the four sides of the rectangular small-sheet image are properly displayed in the scanned image, each side of the small-sheet image is not detected at a position farther than the diagonal line.

The second criterion is that if a positional difference between an edge pixel and an adjacent edge pixel is larger than a predetermined positive value, the edge pixel is not regarded as an effective edge pixel. This is because the side of a small-sheet image is inclined gently with respect to the side of a circumscribed rectangle, and the large positional difference between the two edge pixels thus leads to a determination of a high possibility that the edge pixel is noise.

The third criterion is that if an edge pixel is closer to the side of the circumscribed rectangle than an adjacent edge pixel on the point-of-contact side, the edge pixel is not regarded as an effective edge pixel. This is because if an edge pixel is detected while scanning is performed from the point of contact on the side of the circumscribed rectangle to the farther vertex, the detected edge pixel is naturally farther from the side of the circumscribed rectangle than the adjacent edge pixel. If the edge pixel is closer to the side of the circumscribed rectangle than the adjacent edge pixel, the edge pixel is determined to be highly likely noise.

If a scanned image is determined to have various types of noise in accordance with the criteria, noise immunity in identifying the area of a small-sheet image is enhanced. This will be described with reference to the examples illustrated in FIGS. 6A to 6C.

Figure 6A:
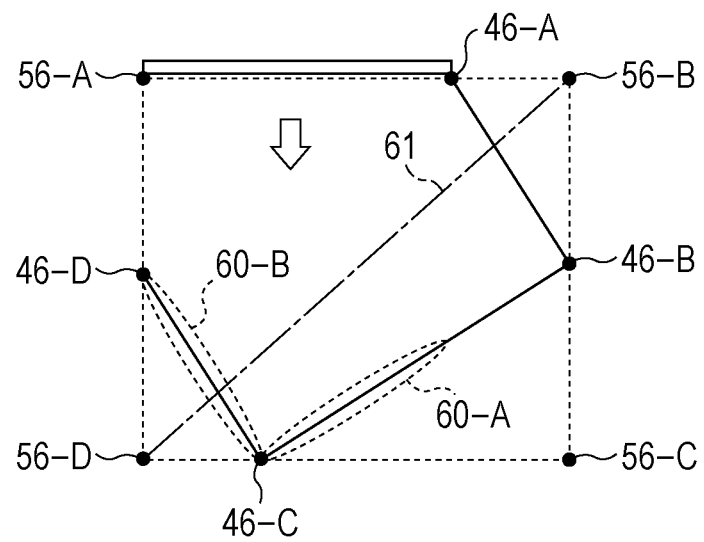
FIGS. 6A, 6B, and 6C are diagrams explaining noise immunity enhancement in identifying the area of a small-sheet image.
Figure 6B:
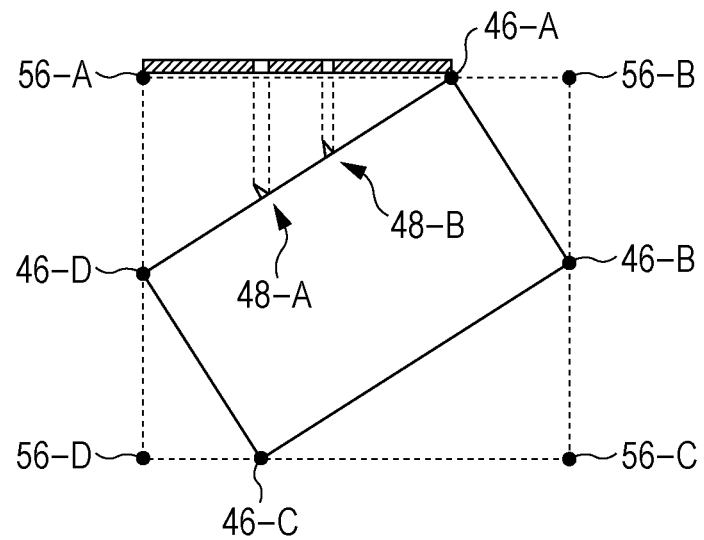
Figure 6C:
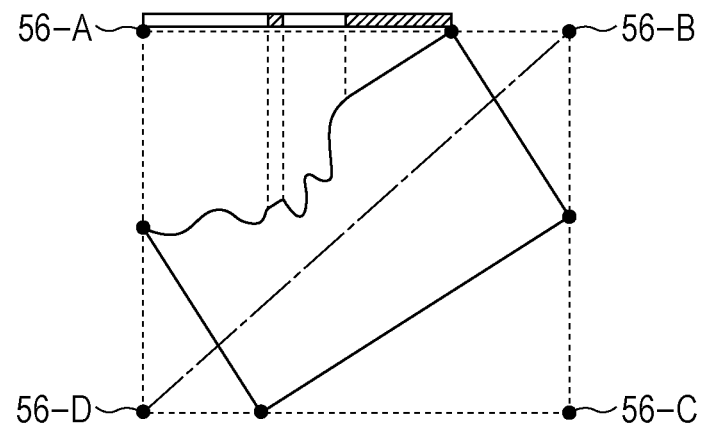

FIGS. 6A to 6C are diagrams explaining noise immunity enhancement in identifying the area of a small-sheet image.

In the example illustrated in FIG. 6A, a small-sheet image does not have an edge in the upper part. In this case, edge pixels 60-A and 60-B are detected as the top side of the circumscribed rectangle. However, the edge pixels 60-A are detected at positions farther than a diagonal 61 and thus are not determined to be effective edge pixels in accordance with the first criterion. In addition, among the edge pixels 60-B, edge pixels closer to a vertex 56-A than the other edge pixels are closer to the upper side. Accordingly, the edge pixels 60-B are not determined to be effective edge pixels in accordance with the third criterion.

In the example illustrated in FIG. 6B, a small-sheet image has protrusions 48-A and 48-B as noise on one side of the small-sheet image. In this case, the protrusions 48-A and 48-B are respectively detected as edge pixels. However, each of the protrusions 48-A and 48-B has a large positional difference from a corresponding adjacent edge pixel and is closer to the top side than the adjacent edge pixel detected at a position close to a vertex 56-B. Accordingly, the protrusions 48-A and 48-B are not determined to be effective edge pixels in accordance with the second and third criteria.

In the example illustrated in FIG. 6C, pixels inside a small-sheet image are determined to be edge pixels in the binarizing process. In this case, the positions of some of the edge pixels indenting the small-sheet image largely fluctuate. In addition, some edge pixels closer to the vertex 56-A than corresponding adjacent edge pixels are closer to the upper side than the adjacent edge pixels. Accordingly, the edge pixels are not determined to be effective edge pixels in accordance with the second and third criteria.

As described above, among the detected edge pixels, edge pixels not located in the outline portion of the small-sheet image may be excluded in accordance with the first to third criteria, and edge pixels located in the outline portion of the small-sheet image may be selected as effective edge pixels.

On the basis of the position coordinates of black pixels determined to be effective edge pixels by the effective-edge determination module 24, the side-skew calculation module 26 calculates the skew of each side composed of the effective edge pixels. Specifically, the side-skew calculation module 26 regards the effective edge pixels acquired for the side of the circumscribed rectangle as one group, identifies a line on a per-group basis, for example, through the least squares method, and calculates the skew of the identified line with respect to the corresponding side of the circumscribed rectangle.

In accordance with consistency between the coordinates of each side composed of effective edge pixels and the skew of the side composed of the effective edge pixels calculated by the side-skew calculation module 26, the extracted-image-area setting module 28 sets an extracted-image area that is a rectangular area in which the small-sheet image is displayed. Note that the extracted-image area is not limited to the inside of the circumscribed rectangle set by the circumscribed-rectangle setting module 18 and may be extended to the outside of the circumscribed rectangle. A process for setting the extended extracted-image area will be described with reference to FIGS. 7A and 7B.

Figure 7A:
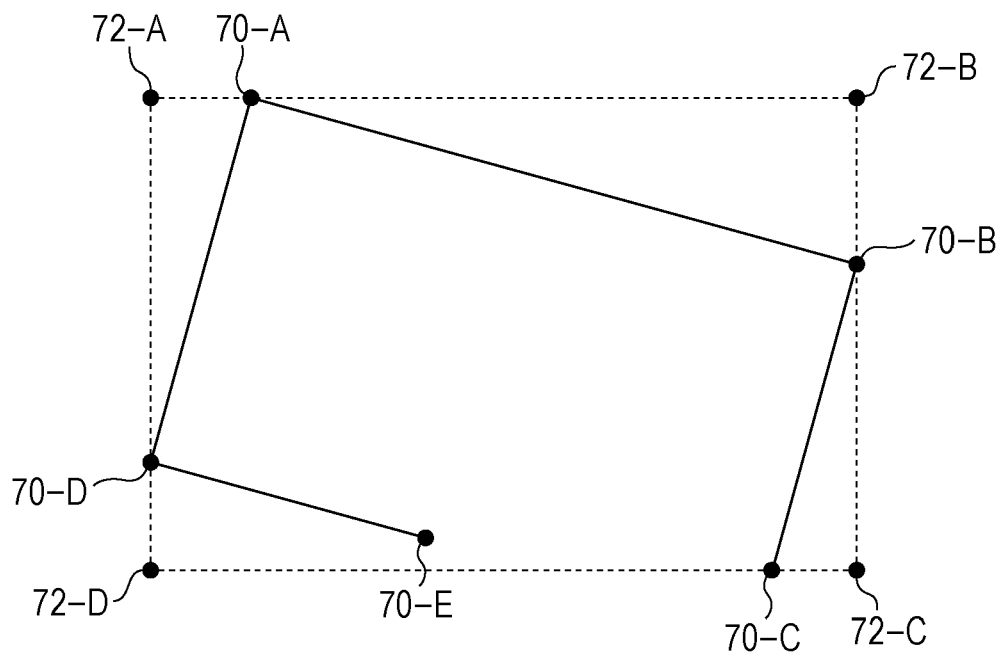
FIGS. 7A and 7B are diagrams explaining a process for setting an extended extracted-image area.
Figure 7B:
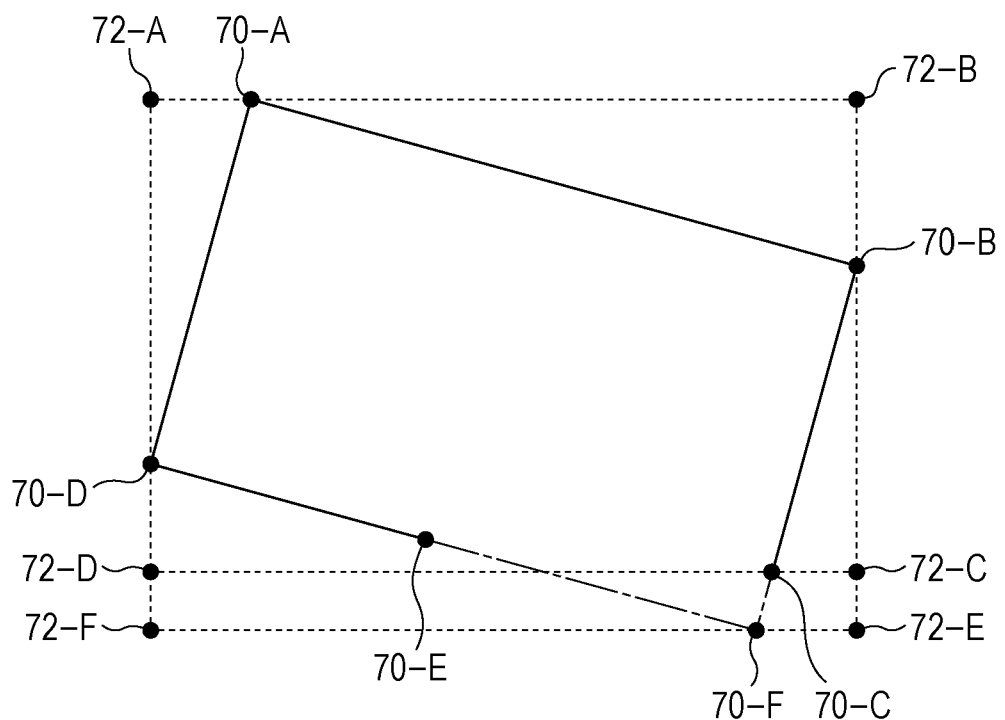

FIGS. 7A and 7B are diagrams explaining the process for setting an extended extracted-image area.

The example in FIG. 7A illustrates a circumscribed rectangle (a rectangle including vertexes 72-A, 72-B, 72-C, and 72-D) set for a binary image (a connected pixel group formed of a line connecting vertexes 70-A, 70-B, 70-C, 70-D, and 70-E) having a partially broken outline. In this state, the process described above is performed with respect to the image of the circumscribed rectangle, and effective edge pixels are acquired. If the consistency of the skew of each side is verified, an extracted-image area (a rectangular area formed of a line connecting the vertexes 70-A and 70-B, a vertex 70-F, and the vertex 70-D) is set, as illustrated in the example in FIG. 7B, by extending the connected pixel group on the basis of a longer one of pairs of mutually parallel sides.

The image extraction module 30 extracts an image from the rectangular extracted-image area set by the extracted-image setting module 28.

The flow of a small-sheet-image extraction process executed by the image-separation processing module 110 will be described with reference to the flowchart in FIG. 8.

As illustrated in FIG. 8, the image acquisition module 105 reads one or more small sheets set in an image reading unit and generates a scanned image, that is, acquires the scanned image (S101). The image-separation processing module 110 executes the binarizing process for enhancing edges on the acquired scanned image and generates a binary image (S102). The image-separation processing module 110 labels each connected pixel group included in the generated binary image (S103) and sets a circumscribed rectangle for the labelled connected pixel group (S104).

The image-separation processing module 110 determines whether the connected pixel group included in the set circumscribed rectangle is skewed with respect to the circumscribed rectangle (S105). If the image-separation processing module 110 determines that the circumscribed rectangle is not skewed, the image-separation processing module 110 sets the circumscribed rectangle as an extracted-image area (S109). If the image-separation processing module 110 determines that the circumscribed rectangle is skewed, the image-separation processing module 110 performs the following steps.

The image-separation processing module 110 detects the edge pixels of each side of the circumscribed rectangle in such a manner as to perform scanning operations in the direction perpendicular to the side including vertexes of the circumscribed rectangle and a point of contact with the connected pixel group. The image-separation processing module 110 performs the scanning operations one by one from each of points on a line extending from the point of contact to one of the vertexes farther from the point of contact (S106). The image-separation processing module 110 selects, from the detected edge pixels, effective edge pixels constituting the outline portion of the small-sheet image (S107).

The image-separation processing module 110 executes the above-described process for detecting the effective edge pixels on each side of the circumscribed rectangle and calculates the skew of the side composed of the acquired effective edge pixels (S108). The image-separation processing module 110 sets a rectangular extracted-image area on the basis of the consistency between the side composed of the effective edge pixels and the skew calculated for the side (S109). The image-separation processing module 110 performs the steps described above on each circumscribed rectangle and extracts an image for a rectangular area thus set (S110). The image-separation processing module 110 extracts each small-sheet image displayed in the corresponding scanned image.

As described above, the image-separation processing module 110 enables noise immunity to be enhanced when a rectangular image that is a rectangular document (small sheet) or the like is extracted from a target image.

Figure 9:
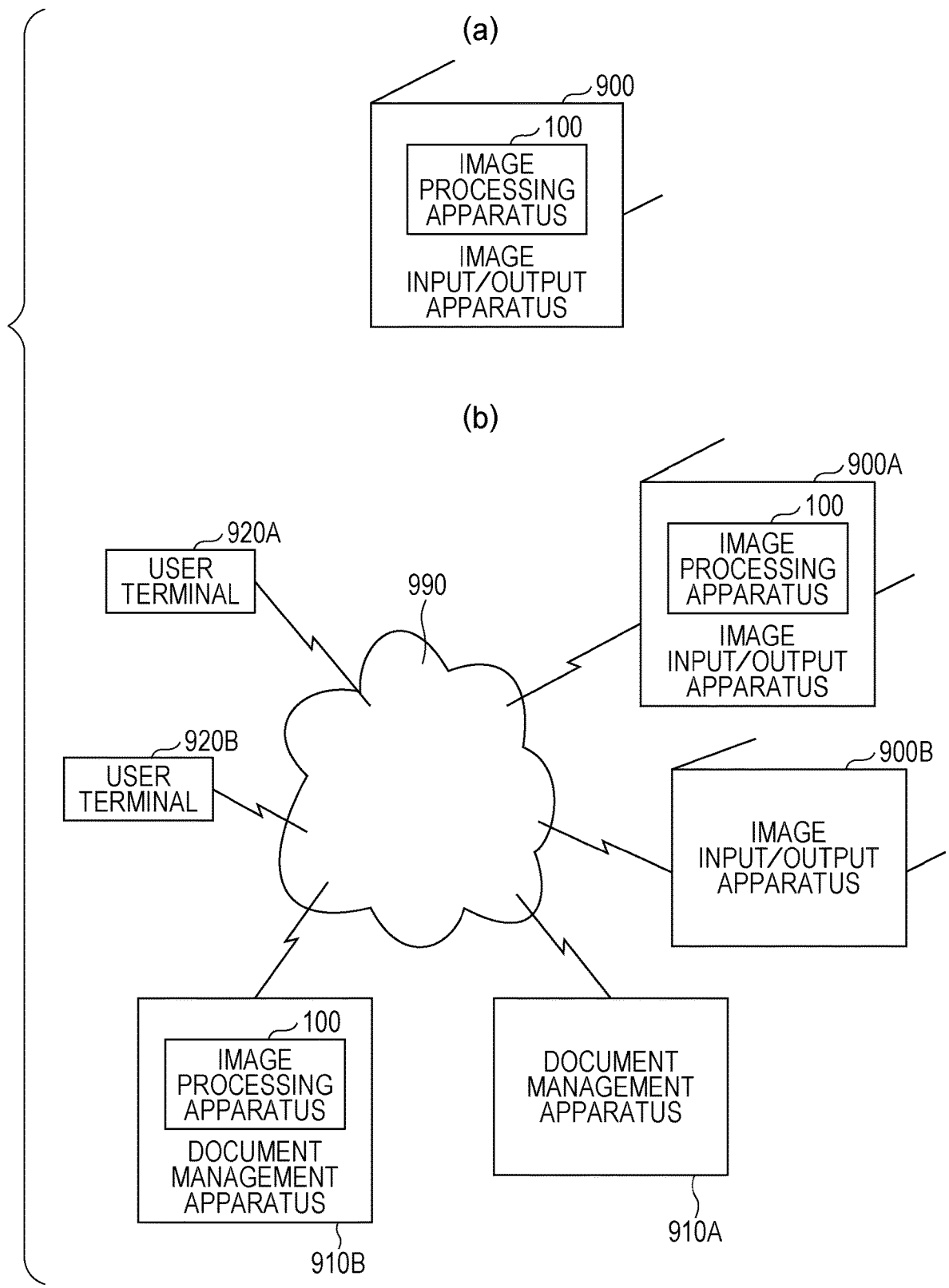
FIG. 9 is an explanatory diagram illustrating an example configuration of a system using the first exemplary embodiment and a second exemplary embodiment.

FIG. 9 is an explanatory diagram illustrating an example configuration of a system using the first exemplary embodiment and a second exemplary embodiment.

An example apparatus illustrated in part (a) of FIG. 9 is configured as a standalone apparatus, and an image input/output apparatus 900 includes an image processing apparatus 100. A target image is acquired with a scanner included in the image input/output apparatus 900, and successfully extracted small-sheet images are output to a universal serial bus (USB) memory or another device. In the case where a small-sheet image is unsuccessfully extracted and results in multiple small-sheet images, an image including the small-sheet images that are combined may be displayed on a display device such as a panel included in the image input/output apparatus 900.

An example system illustrated in part (b) of FIG. 9 is configured as a network system, and an image input/output apparatus 900A, an image input/output apparatus 900B, a document management apparatus 910A, a document management apparatus 910B, a user terminal 920A, and a user terminal 920B are connected to each other via a communication network 990. The communication network 990 may be a wireless or wired network, or a combination of these. The communication network 990 may also be, for example, the Internet serving as a communication infrastructure, an intranet, or the like. The functions of the document management apparatus 910 may be implemented as cloud services. For example, in a case where name cards are processed as small sheets, the document management apparatus 910 is a name-card database and performs recognition of a name-card image, creation of an organization chart, analysis of a relationship with a contact person of a company, and the like. In a case where receipts are processed as small sheets, the document management apparatus 910 is an accounting server and performs recognition of receipt images, expense settlement, final tax declaration processing, and the like.

The image input/output apparatus 900A includes an image processing apparatus 100. For example, the image input/output apparatus 900A transmits, to the document management apparatus 910A, a result of processes executed by the image processing apparatus 100 (an image including one or more successfully extracted small-sheet images and combined unsuccessfully extracted small-sheet images). A user checks the result of the processes with the corresponding user terminal 920.

The document management apparatus 910B includes an image processing apparatus 100. For example, the image input/output apparatus 900B transmits a read image (image including small-sheet images) to the document management apparatus 910B. The document management apparatus 910B transmits, to one of the user terminals 920, a result of processes executed by the image processing apparatus 100 in the document management apparatus 910B (an image including one or more successfully extracted small-sheet images and combined unsuccessfully extracted small-sheet images), and the user of the user terminal 920 checks the result of the processes with the user terminal 920.

Figure 10:
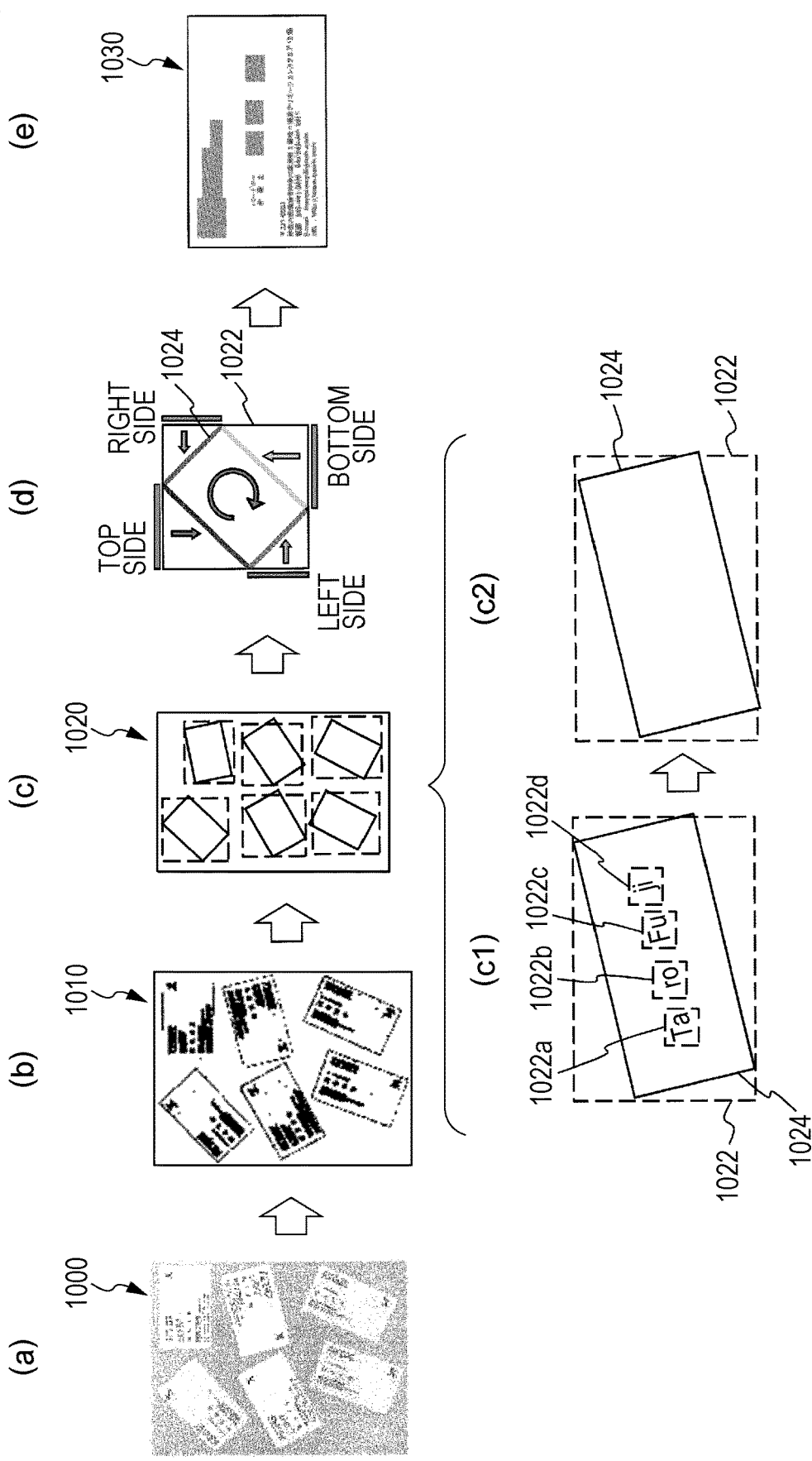
FIG. 10 is an explanatory diagram illustrating an example of a process according to the first exemplary embodiment.

FIG. 10 is an explanatory diagram illustrating an example of a process according to the first exemplary embodiment (an example in which images are successfully extracted). For example, small sheets such as name cards or receipts are disposed on the platen of the image processing apparatus 100, and the image processing apparatus 100 separates small-sheet images from each other on the basis of a scanned image including the whole platen area.

An image 1000 illustrated in part (a) of the example in FIG. 10 is generated by reading six name cards.

An image 1010 illustrated in part (b) of the example in FIG. 10 results from the edge enhancement and binarizing processes.

An image 1020 illustrated in part (c) of the example in FIG. 10 results from labeling and the circumscribed-rectangle separation process. For example, as illustrated in part (c1) of FIG. 10, an edge image 1024 is present in a circumscribed rectangle 1022. Circumscribed rectangles 1022a, 1022b, 1022c, and 1022d respectively surround, "Ta", "ro", "Fu", and "ji". Note that any object located outside the circumscribed rectangles 1022a to 1022d in the circumscribed rectangle 1022 is not a target of the process in this example. Specifically, as illustrated in part (c2) of the example in FIG. 10, the circumscribed rectangles 1022a, 1022b, 1022c, and 1022d contained in the circumscribed rectangle 1022 are deleted. Alternatively, in this case, a threshold may be used to omit verification of inclusion in a circumscribed rectangle not smaller than a specific size (such as a name-card size).

The skew estimation process and the angle calculation process as described above are illustrated by using the circumscribed rectangle 1022 illustrated in part (d) of the example in FIG. 10. For example, if three or more sides of the edge image 1024 in the circumscribed rectangle 1022, a rotation angle is calculated.

A name-card image 1030 illustrated in part (e) of the example in FIG. 10 is a successfully extracted name-card image and has undergone the process for extracting an image from the image 1000 that is the original image and a rotation correction process.

Figure 11:
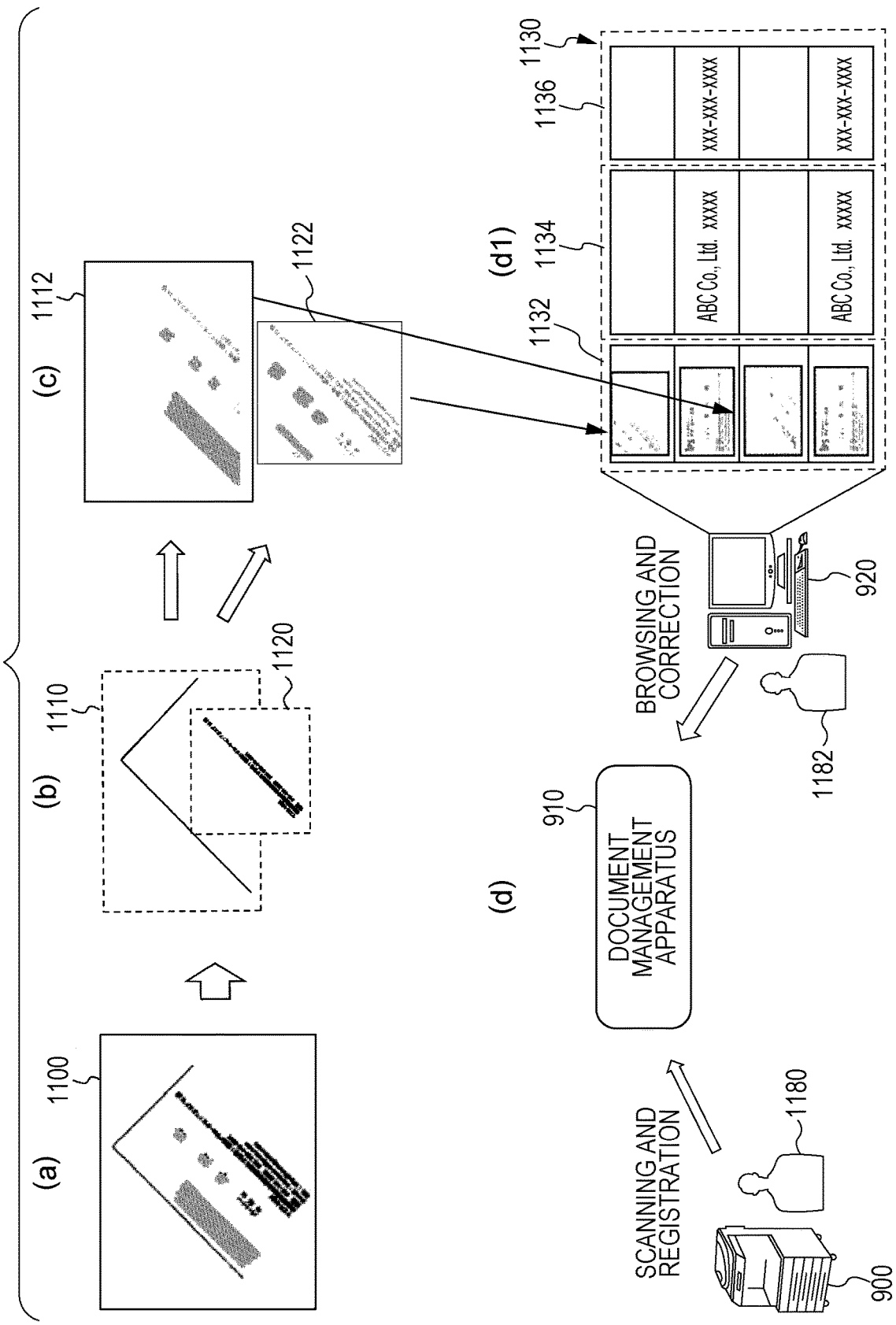
FIG. 11 is an explanatory diagram illustrating an example of a process executed without the first exemplary embodiment.

FIG. 11 is an explanatory diagram illustrating an example of a process executed without the first exemplary embodiment (an example in which small-sheet images are unsuccessfully extracted). The outline of a name card is not detected as connected lines, for example, under a condition in which the scanning density is low, and the image of the one name card is identified as multiple images in some cases. A user does not easily recognize which name card has been unsuccessfully extracted, and a correction step to be performed later is laborious.

An image 1100 illustrated in part (a) of the example in FIG. 11 is an image partially illustrating a name card that has been read and that has undergone the edge enhancement and binarizing processes (corresponding to a part of the image 1010 described above). In the illustrated example, a lower part of the outline of the name card is not detected in the edge detection.

Grouping results 1110 and 1120 illustrated in part (b) of the example in FIG. 11 illustrate example labeling (grouping) results. Specifically, one name-card image is divided into the two grouping results 1110 and 1120.

If these are extracted as name-card images, a name-card image (failure) 1112 corresponding to the grouping result 1110 and a name-card image (failure) 1122 corresponding to the grouping result 1120 are extracted as illustrated in part (c) of the example in FIG. 11. Specifically, two images constituting one name-card image are finally output.

Part (d) of the example in FIG. 11 illustrates the result of a process executed in the configuration illustrated in the example in part (b) of FIG. 9. A user 1180 uses the image input/output apparatus 900 to cause multiple name cards to be read and transmitted to the document management apparatus 910. A user 1182 uses the user terminal 920 to check the result of extraction of the name-card images in the document management apparatus 910.

The user terminal 920 presents the result of extraction of the name-card images on a screen 1130 of the user terminal 920. A name-card image column 1132, a company-name/name recognition column 1134, and a telephone-number recognition result column 1136 are displayed on the screen 1130. Each of the name-card images (failure) 1112 and 1122 constituting one name-card image is handled as one name-card image. It is not easy for the user 1182 to determine which name card has been unsuccessfully extracted, and correction of multiple images, which is laborious, has to be performed.

In contrast, according to the first exemplary embodiment, unsuccessfully extracted small-sheet images are displayed as one name-card image. This enables the user 1182 to easily identify which name card has been unsuccessfully extracted and reduces the number of images to be corrected.

Figure 12:
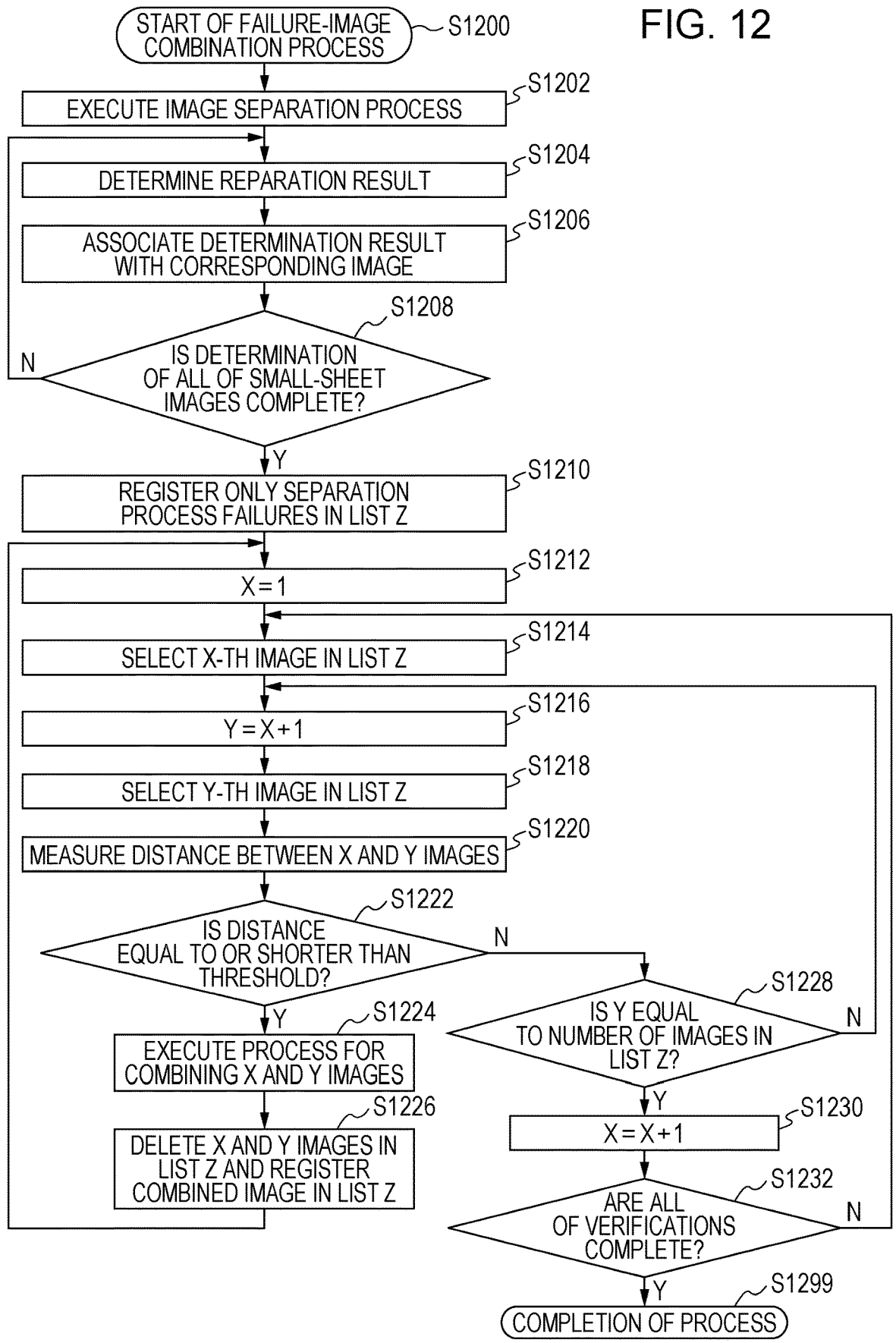
FIG. 12 is a flowchart illustrating an example of the process according to the first exemplary embodiment.

FIG. 12 is a flowchart illustrating an example of the process according to the first exemplary embodiment (typically executed by the determination module 115 and the image generation module 120).

In step S1200, the image processing apparatus 100 starts a failure-image combination process (process for combining unsuccessfully extracted images (failure images)).

In step S1202, the image-separation processing module 110 executes the image separation process. For example, the process executed in accordance with a flowchart illustrated in FIG. 8 is executed.

In step S1204, the determination module 115 determines the separation result, specifically, whether each small-sheet image is successfully (or unsuccessfully) extracted. The determination module 115 may execute the determination process as described above.

For example, if the size of the circumscribed rectangle is not within the predetermined size range in steps S104 and S105 illustrated in FIG. 8, the determination module 115 may determine that the small-sheet image is unsuccessfully extracted. Note that as the "predetermined size range", for example, a range from the size of a name card (the minimum circumscribed rectangle) to the maximum circumscribed rectangle resulting from rotation of the name card may be set. The "maximum circumscribed rectangle" is a circumscribed rectangle observed when a diagonal line of the name card is located horizontally (or vertically). Specifically, a pair of sides of the circumscribed rectangle is as long as the diagonal line, and the other pair of sides is as long as a line extending parallel to the sides from the uppermost end of the name card to a point corresponding to the lowermost end (or from the leftmost end to a point corresponding to the rightmost end) with the diagonal line being located horizontally (or vertically).

In addition, for example, if the number of sides each composed of effective edge pixels is smaller than three in steps S107 and S108 illustrated in FIG. 8, the determination module 115 may determine that the small-sheet image is unsuccessfully extracted. This is because if two sides or less are detected as effective edges, multiple images originally constituting one name-card image are extracted, as illustrated in part (b) of the example in FIG. 11.

In step S1206, the determination module 115 associates the determination result with the corresponding small-sheet image.

In step S1208, the determination module 115 determines whether determination of all of the small-sheet images in a target image to obtain the separation results is complete. If the determination is complete, the process proceeds to step S1210. In the other cases, the process returns to step S1204.

Figure 13:
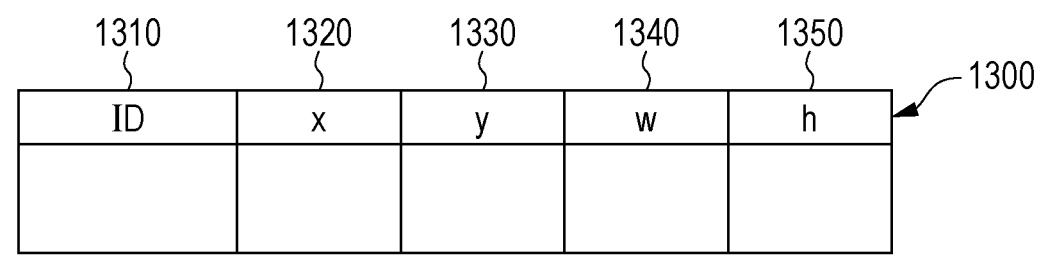

In step S1210, the determination module 115 registers one or more separation process failures except a success in a list Z. Examples of the list Z include a list 21300. FIG. 13 is an explanatory table illustrating a data structure example of the list 21300. The list 21300 has an identification (ID) column 1310, an x column 1320, a y column 1330, a w column 1340, and an h column 1350. The ID column 1310 stores therein an ID that uniquely identifies an image resulting from the separation (hereinafter, also referred to as a separation-result image). The x column 1320 stores therein the x coordinate of the upper left corner of the separation-result image. The y column 1330 stores therein the y coordinate of the upper left corner of the separation-result image. The w column 1340 stores therein the width (w) of the separation-result image. The h column 1350 stores therein the height (h) of the separation-result image. A data structure other than that of the list Z1300 may be used. For example, an image (file) resulting from the separation may be registered in the list Z.

In step S1212, the image generation module 120 sets a variable X to 1. The variable X indicates one of separation-result images.

In step S1214, the image generation module 120 selects the X-th image in the list Z.

In step S1216, the image generation module 120 sets a variable Y to X+1. The variable Y indicates one of the separation-result images, and it is determined whether the image indicated by Y is to be combined with the image indicated by the variable X.

In step S1218, the image generation module 120 selects the Y-th image in the list Z.

In step S1220, the image generation module 120 measures a distance between images respectively indicated by X and Y.

In step S1222, the image generation module 120 determines whether the distance is equal to or shorter than a threshold. If the distance is equal to or shorter than the threshold, the process proceeds to step S1224. In the other cases, the process proceeds to step S1228. Note that if an image corresponding to the variable Y is not present, the process also proceeds to step S1228.

In step S1224, the image generation module 120 executes a process for combining the X and Y images. For example, the image generation module 120 generates a circumscribed rectangle surrounding both the separation-result images respectively indicated by X and Y.

In step S1226, the image generation module 120 deletes the X and Y images from the list Z and registers a combined image in the list Z, and the process returns to step S1212.

In step S1228, the image generation module 120 determines whether the value of the variable Y is equal to the number of images in the list Z. If the value is equal to the number of images in the list Z, the process proceeds to step S1230. In the other cases, the process returns to step S1216. Specifically, the image generation module 120 determines whether all of the combinations of the separation-result image indicated by X and any other separation-result image have been determined.

In step S1230, the image generation module 120 sets X=X+1 (increments the value of the variable X by one).

In step S1232, the image generation module 120 determines whether all of verifications are complete. If all of verifications are complete, the failure-image combination process is complete (step S1299). In the other cases, the process returns to step S1214. Specifically, it is determined whether all of combinations of the separation-result images are determined.

FIGS. 14A to 14D3 are explanatory diagrams illustrating the example of the process according to the first exemplary embodiment, specifically, the example of the process executed in accordance with the specific example in the flowchart illustrated in FIG. 12.

An image 1400 illustrated in the example in FIG. 14A is a process target image and has been generated after scanning is performed one time. For example, the image 1400 includes captured images that are name cards 1402, 1404, and 1406.

An image separation result 1410 illustrated in the example in FIG. 14B illustrates the result of the process executed on the image 1400 by the image-separation processing module 110. It is determined that a circumscribed rectangle 1412 of the name card 1402 is successfully extracted, circumscribed rectangles 1414, 1416, and 1418 of the name card 1404 are unsuccessfully extracted, and circumscribed rectangles 1420 and 1422 of the name card 1406 are unsuccessfully extracted. This is because it is determined that the size or the number of sides does not satisfy the criterion for successful extraction.

The examples in FIG. 14C1 to 14C4 illustrate the process for combining the failure images.

In the example in FIG. 14C1, failure images are saved in the list Z. Specifically, the circumscribed rectangles 1414, 1416, 1418, 1420, and 1422 are saved in the list Z. Note that parts (a), (b), (c), (d), and (e) of FIG. 14C1 respectively correspond to the circumscribed rectangles 1414, 1416, 1420, 1418, and 1422.

In the example in FIG. 14C2, distances between two images are measured, two images in a short distance are combined, the images (separated images) are deleted, and an image resulting from the combination is registered as a new image. In this example, part (f) is added as the result of combining parts (a) and (b).

The process is repeated. Specifically, in the example in FIG. 14C3, part (g) is added as the result of combining parts (c) and (e). In the example in FIG. 14C4, part (h) is added as the result of combining parts (d) and (f). Finally, there are two images.

The examples in FIGS. 14D1, 14D2, and 14D3 respectively illustrate output of three images resulting from the extraction. The image in FIG. 14D1 is an image generated after successful extraction of the name-card image. The images in FIGS. 14D2 and 14D3 are images generated after unsuccessful extraction of the name-card images, for example, images displayed after the combination process in the name-card image column 1132 on the screen 1130 illustrated in FIG. 11.

If the first exemplary embodiment is not used, the image in FIG. 14D2 is displayed in such a manner as to be divided into the three images in parts (a), (b) and (d) of FIG. 14C1 (the circumscribed rectangles 1414, 1416, and 1418), and the image in FIG. 14D3 is displayed in such a manner as to be divided into the two images in parts (c) and (e) of FIG. 14C1 (the circumscribed rectangles 1420 and 1422). Accordingly, the images are not easily associated with the original name-card images. However, displaying the images as in FIGS. 14D1 to 14D3 leads to easy identification of the unsuccessfully extracted original name-card images.

Second Exemplary Embodiment

Figure 15:
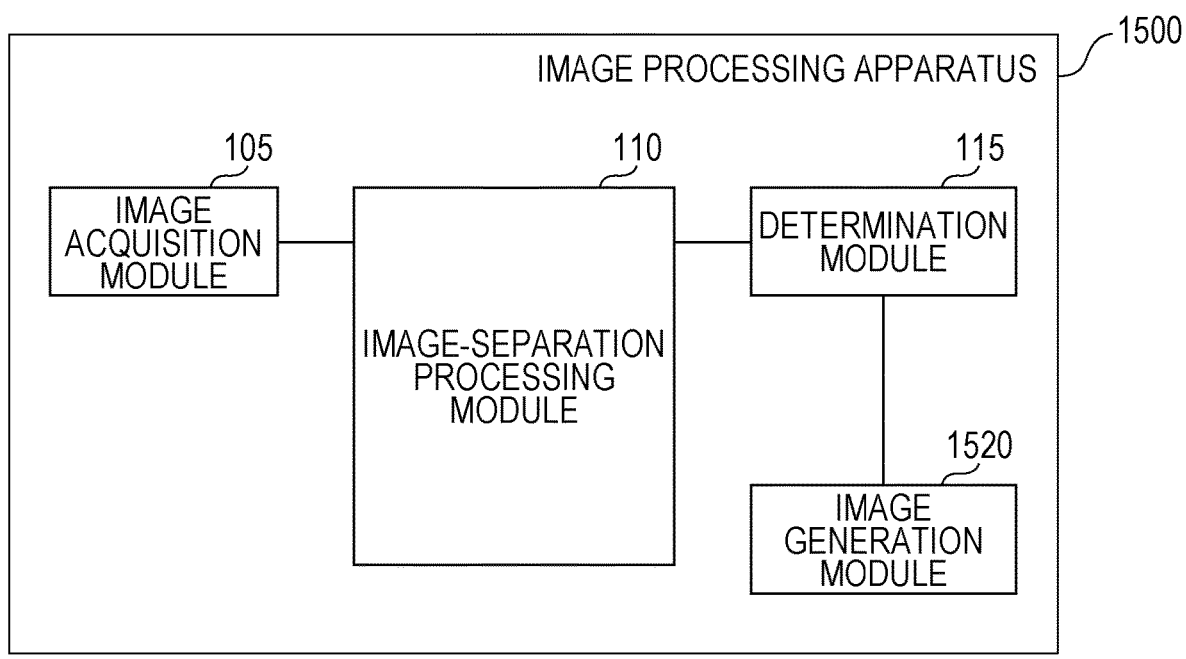
FIG. 15 is a diagram of an example configuration of conceptual modules of the second exemplary embodiment.

FIG. 15 is a diagram of an example configuration of conceptual modules of the second exemplary embodiment.

An image processing apparatus 1500 includes the image acquisition module 105, the image-separation processing module 110, the determination module 115, and an image generation module 1520. Note that the same components as those in the first exemplary embodiment are denoted by the same reference numerals, and repeated explanation is omitted.

The image generation module 1520 is connected to the determination module 115. In a case where one or more small-sheet images in an image acquired by the image acquisition module 105 are unsuccessfully extracted, the image generation module 1520 generates an image in such a manner that one or more successfully extracted small-sheet images are erased from the image. To determine the "case where one or more small-sheet images in an image are unsuccessfully extracted", for example, a result of determination performed by the determination module 115 may be used. The process executed by the image generation module 1520 causes the one or more unsuccessfully extracted images to be left and makes it easier to identify which small sheet has been unsuccessfully extracted.

Figure 16:
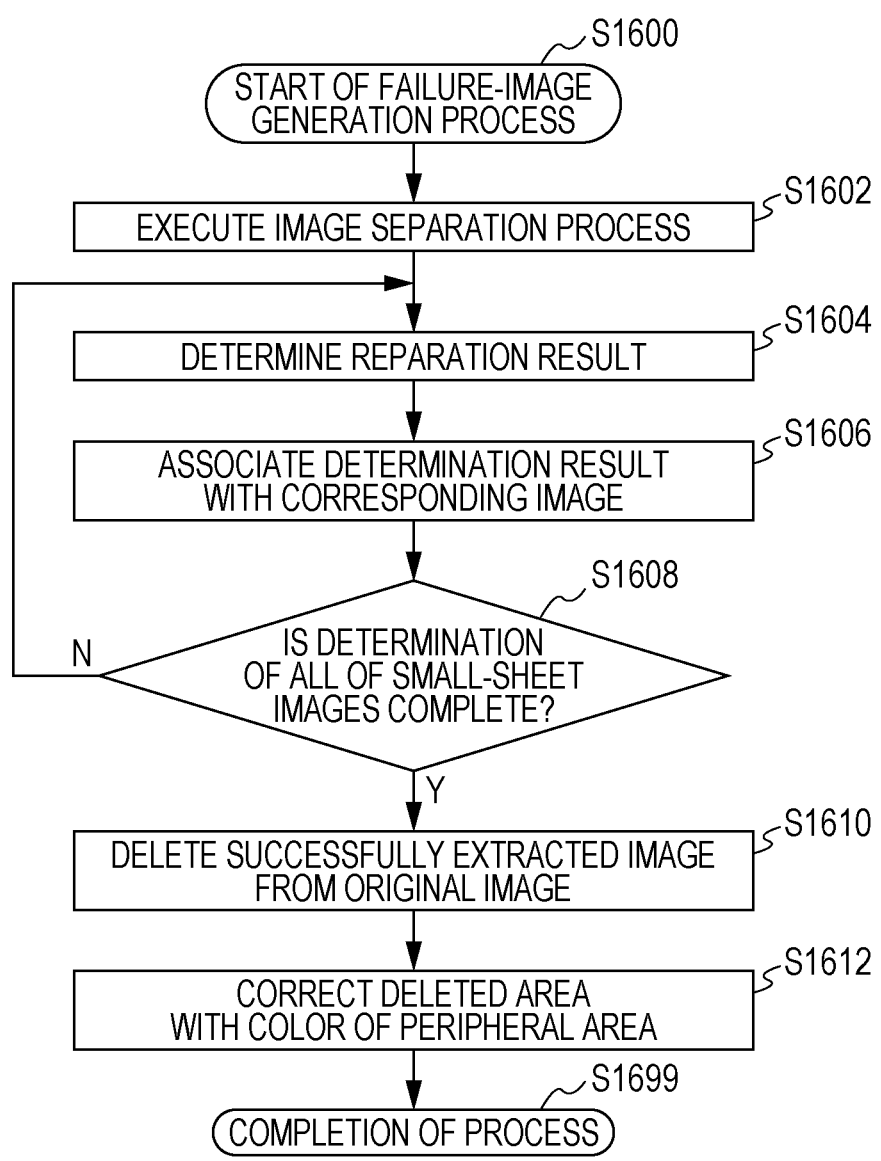
FIG. 16 is a flowchart illustrating an example of a process according to the second exemplary embodiment.

FIG. 16 is a flowchart illustrating an example of the process according to the second exemplary embodiment. Note that steps from S1602 to S1608 are the same as steps S1202 to S1208 in the flowchart illustrated in the example in FIG. 12.

In step S1600, a failure-image generation process is started.

In step S1602, the image separation process is executed.

In step S1604, the separation result is determined.

In step S1606, the determination result is associated with the corresponding small-sheet image.

In step S1608, it is determined whether determination of all of the small-sheet images is complete. If the determination is complete, the process proceeds to step S1610. In the other cases, the process returns to step S1604.

In step S1610, one or more successfully extracted images are deleted from the original image. Specifically, one or more images extracted successfully as small-sheet images are deleted from the image acquired by the image acquisition module 105. Accordingly, only images extracted unsuccessfully as the small-sheet images are left.

In step S1612, a deleted area is corrected with the color of an area around the deleted area (peripheral area). Specifically, the deleted area is filled with the color of the peripheral area. The color of the peripheral area may have a statistical value (such as a mean, a median, or a mode) of the color of the peripheral area. Note that step S1612 may be omitted.

In step S1699, the failure-image generation process is complete.

FIGS. 17A, 17B, 17C, and 17D are explanatory diagrams illustrating the example of the process according to the second exemplary embodiment, specifically, the example of the process executed in accordance with the specific example in the flowchart illustrated in FIG. 16.

Figure 17C:
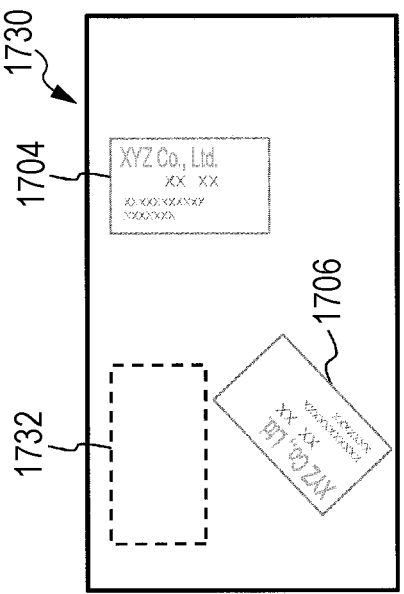
FIGS. 17A, 17B, 17C, and 17D are explanatory diagrams illustrating the example of the process according to the second exemplary embodiment.
Figure 17D:
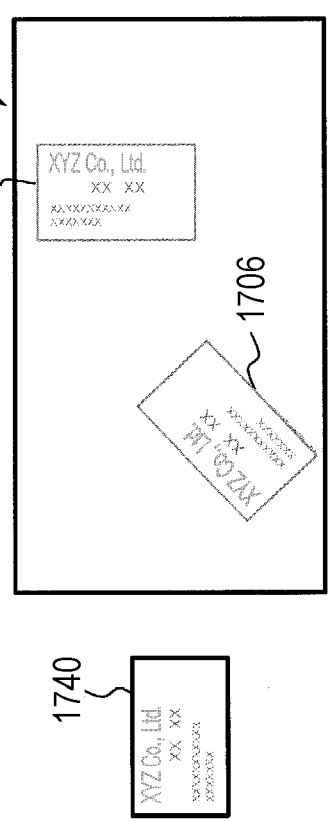
Figure 17A:
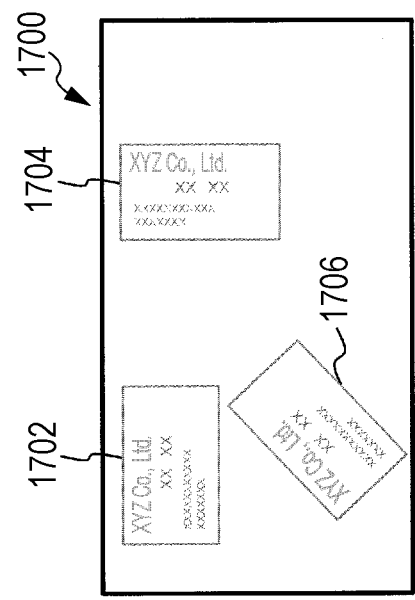

An image 1700 illustrated in the example in FIG. 17A is a process target image and has been generated after scanning is performed one time. For example, the image 1700 includes captured images that are name cards 1702, 1704, and 1706, like the image 1400 illustrated in the example in FIG. 14A.

Figure 17B:
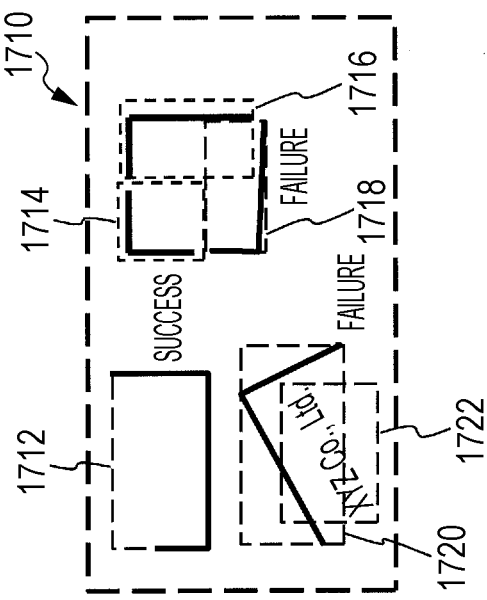

An image separation result 1710 illustrated in the example in FIG. 17B illustrates the result of the process executed on the image 1700 by the image-separation processing module 110. The image separation result 1710 is equivalent to the image separation result 1410 illustrated in the example in FIG. 14B. It is determined that a circumscribed rectangle 1712 of the name card 1702 is successfully extracted, circumscribed rectangles 1714, 1716, and 1718 of the name card 1704 are unsuccessfully extracted, and circumscribed rectangles 1720 and 1722 of the name card 1706 are unsuccessfully extracted. This is because it is determined that the size or the number of sides does not satisfy the criterion for successful extraction.

In an image 1730 illustrated in the example in FIG. 17C, the successfully extracted small-sheet image (the image of the name card 1702) has been deleted. Specifically, if failure images are included, a composite image (the image 1730) is generated. In the composite image, the success image is erased, and a successfully extracted area 1732 is filled with the color of the peripheral area. The unsuccessfully extracted name cards 1704 and 1706 are thus left in the image 1730.

The example in FIG. 17D illustrates output of two images resulting from the extraction, specifically, a name-card image 1740 in a success image group and the image 1730 composed of the failure images. In the example in FIG. 17D, the success image group is composed of the one name-card image 1740. However, if multiple name-card images are successfully extracted, the success image group is composed of the multiple name-card images.

If the second exemplary embodiment is not used, the image of the name card 1704 in FIG. 17A is displayed in such a manner as to be divided into the three images of the circumscribed rectangles 1714, 1716, and 1718, and the image of the name card 1706 is displayed in such a manner as to be divided into two images of the circumscribed rectangles 1720 and 1722. Accordingly, the images are not easily associated with the original name-card images. However, displaying the images as in FIG. 17D leads to easy identification of the original name-card images of the unsuccessfully extracted name-card images.

Figure 18:
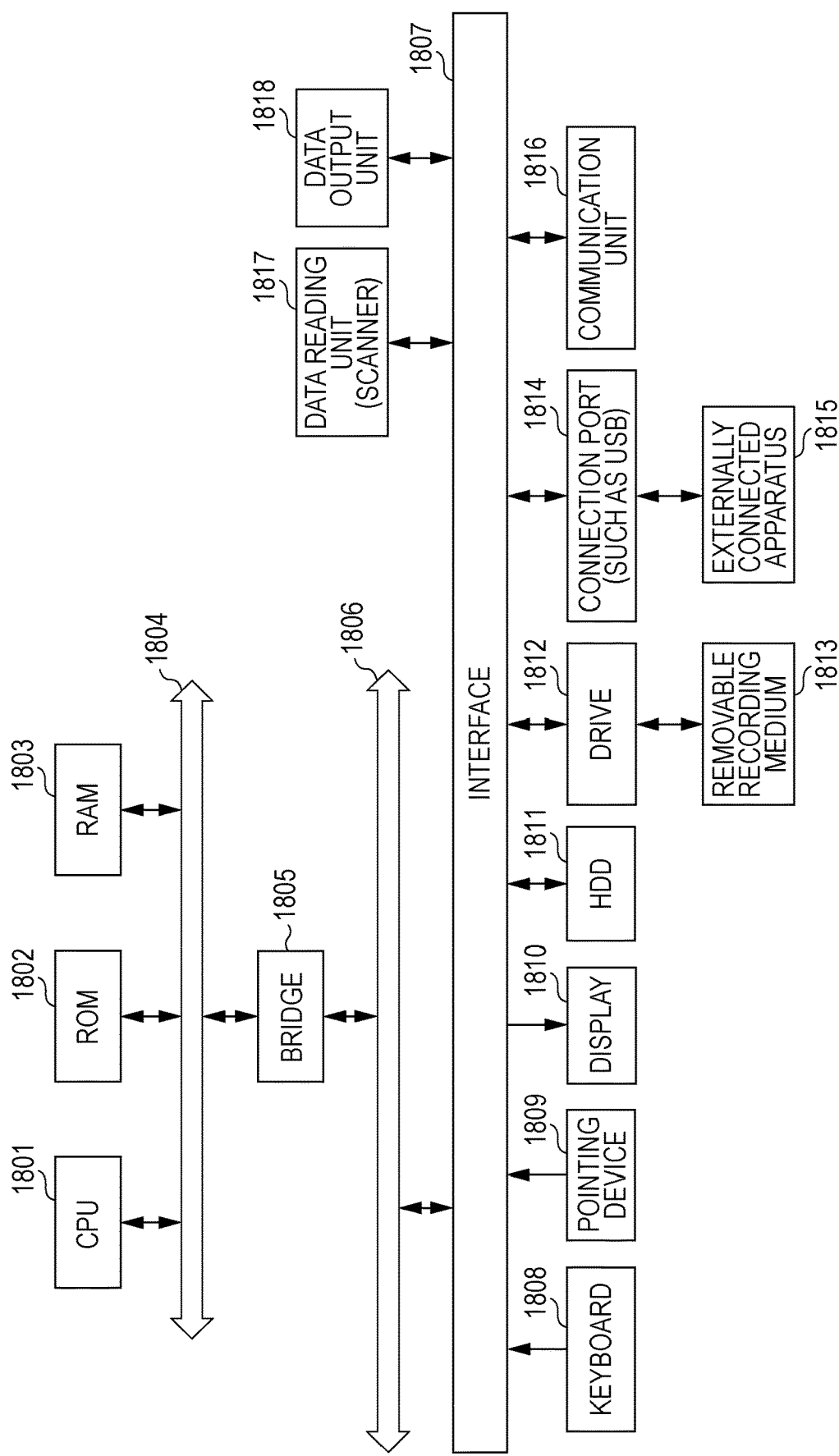
FIG. 18 is a block diagram illustrating an example hardware configuration of a computer implementing the exemplary embodiments.

An example hardware configuration of the image processing apparatus according to the exemplary embodiments will be described with reference to FIG. 18. The configuration illustrated in FIG. 18 is implemented by, for example, a personal computer (PC) and is an example hardware configuration including a data reading unit 1817 such as a scanner and a data output unit 1818 such as a printer.

A CPU 1801 is a controller that executes a process in accordance with a computer program describing a sequence of executing the various modules described above for the exemplary embodiments, that is, the modules such as the image acquisition module 105, the image-separation processing module 110, the determination module 115, the image generation module 120, and the image generation module 1520.

A read-only memory (ROM) 1802 is used to store a program used by the CPU 1801, operational parameters, and the like. A RAM 1803 is used to store the program used when the CPU 1801 is run, parameters appropriately varying when the CPU 1801 is run, and the like. These components are mutually connected via a host bus 1804 including a CPU bus and other components.

The host bus 1804 is connected to an external bus 1806 such as a peripheral component interconnect/interface (PCI) bus with a bridge 1805 placed therebetween.

A keyboard 1808 and a pointing device 1809 such as a mouse are devices operated by an operator. A display 1810 has a liquid crystal display device, a cathode ray tube (CRT), or the like and displays various pieces of information as text information and image information. The display 1810 may be a touch screen or the like having both the functions of the pointing device 1809 and the display 1810. In this case, to implement the function of the keyboard, a keyboard (so-called a software keyboard or a screen keyboard) may be drawn on a screen (touch screen) by software without physically connecting the keyboard 1808.

A hard disk drive (HDD) 1811 has a hard disk (may be a flash memory or the like) incorporated therein, drives the hard disk, and records and reproduces the program run by the CPU 1801 and information. The hard disk stores therein a target image, an image resulting from the process, the list Z1300, and the like. Further, the hard disk stores therein various pieces of other data, various computer programs, and the like.

A drive 1812 reads out data or a program recorded in a removable recording medium 1813 such as a magnetic disk, an optical disk, a magneto-optical disk, or a semiconductor memory that is attached to the drive 1812 and supplies the data or the program to the RAM 1803 connected to the drive 1812 with an interface 1807, the external bus 1806, the bridge 1805, and the host bus 1804 located therebetween. The removable recording medium 1813 is also usable as a data recording area like the hard disk.

A connection port 1814 is a port for connection with an externally connected apparatus 1815 and has a USB- or IEEE1394-compliant connection unit. The connection port 1814 is connected to the CPU 1801 and the like with the interface 1807, the external bus 1806, the bridge 1805, the host bus 1804, and the like located therebetween. A communication unit 1816 is connected to a communication network and executes processes of data communication with external apparatuses. The data reading unit 1817 is, for example, a scanner and executes processes of reading documents. The data output unit 1818 is, for example, a printer and executes processes of outputting document data.

The hardware configuration of the information processing apparatus in FIG. 18 merely illustrates a configuration example, and each exemplary embodiment is not limited to the configuration in FIG. 18. Any configuration that enables the modules described in the exemplary embodiment to be run may be employed. For example, at least one of the modules may be configured to run on hardware dedicated to the module (such as an application specific integrated circuit (ASIC)). At least one of the modules may be in an external system and be connected through a communication network. Further, multiple systems each serving as the system in FIG. 18 may be mutually connected through a communication network to work in cooperation with each other. In particular, the configuration may be incorporated in a mobile telecommunication device (including a mobile phone, a smartphone, a mobile device, a wearable computer, and other devices), a personal digital electronics, a robot, a copier, a fax machine, a scanner, a printer, a multifunction printer (an information processing apparatus having two or more functions of a scanner, a printer, a copier, a fax machine, and other devices), or the like, aside from a personal computer.

In addition, the phrases "not smaller than", "not larger than", "larger than", and "smaller than" have been used in the description of the comparison in the aforementioned exemplary embodiments. However, if the value combination is consistent, the phrases may be replaced with the phrases "larger than", "smaller than", "not smaller than", and "not larger than", respectively.

Note that the program described above may be provided by using a recording medium having the program recorded therein and may be provided by using a communication unit. In this case, for example, the program described above may be regarded as an exemplary embodiment of the invention of a "non-transitory computer readable medium having a program recorded therein".

The "non-transitory computer readable medium having a program recorded therein" refers to a computer readable recording medium having a program recorded therein that is used for installation, execution, distribution, and the like of a program.

Examples of the recording medium include: a digital versatile disk (DVD) supporting "DVD-R, DVD-RW, DVD-RAM, and the like" that are standards designated by the DVD Forum and "DVD+R, DVD+RW, and the like" that are standards designated in accordance with "DVD+RW; a compact disc (CD) such as a CD-ROM, a CD recordable (CD-R), a CD rewritable (CD-RW), or the like; a Blu-ray (registered trademark) disc; a magneto-optical disk (MO); a flexible disk (FD); a magnetic tape; a hard disk; a ROM; an electrically erasable and programmable ROM (EEPROM (registered trademark)); a flash memory; a RAM; and a secure digital (SD) memory card.

Part or the entirety of the aforementioned program may also be saved on the recording medium to be stored or distributed. The program or part thereof may be transmitted through communication by using a transmission medium such as a wired network used for a local area network (LAN), a metropolitan area network (MAN), a wide area network (WAN), the Internet, an intranet, an extranet, or the like; a wireless communication network; or a combination of these. Alternatively, the program or part thereof may be transmitted by using carrier signals.

Further, the program may be part or the entirety of another program, or may be saved on a recording medium together with a different program. The program may also be divided to be saved on multiple recording media. The program may be saved in any manner such as by being compressed or encrypted, as long as the program is restorable.

The above-described exemplary embodiments (in particular, the image-separation processing module 110) may be regarded as follows.

[A1] There is provided an image extraction apparatus including an acquisition unit, a detection unit, an edge-pixel detection, a selection unit, a rectangular-area setting unit, and an extraction unit. The acquisition unit acquires a scanned image generated by scanning a target object that is a small sheet. The detection unit generates a binary image of the acquired scanned image and detects a connected pixel group from the generated binary image. The edge-pixel detection unit detects edge pixels of each of sides of a circumscribed rectangle set for the connected pixel group detected by the detection unit. The edge pixels are detected by performing scanning operations in a direction perpendicular to the side including a first vertex, a second vertex, and a point of contact with the connected pixel group. The scanning operations are performed one by one from each of multiple points on a line extending from the point of contact to the second vertex on the side including the point of contact. The selection unit selects an effective edge pixel that is located in an outline portion of the target object displayed in the scanned image. The selection unit selects the effective edge pixel such that if one of the edge pixels detected by the edge-pixel detection unit is detected at a point farther from the side than a diagonal line of the circumscribed rectangle, the edge pixel is excluded, or such that if a distance between the side and one of the detected edge pixels that is close to the second vertex is shorter than a distance between the side and an adjacent edge pixel close to the point of contact with the connected pixel group, the edge pixel is excluded. The rectangular-area setting unit sets a rectangular area in accordance with the effective edge pixel. The extraction unit extracts an image from the rectangular area set by the rectangular-area setting unit.

[A2] In the image extraction apparatus according to [A1], the selection unit selects the effective edge pixel such that if a distance between one of the detected edge pixels and an adjacent edge pixel is longer than a threshold, the selection unit further excludes the edge pixel.

[A3] In the image extraction apparatus according to [A1] or [A2], the second vertex is farther from the point of contact than the first vertex on the side including the point of contact with the connected pixel group.

[A4] The image extraction apparatus according to any one of [A1] to [A3] further includes a calculation unit that calculates skew of at least three lines each composed of the effective edge pixel in accordance with position coordinates of the effective edge pixel. The rectangular-area setting unit sets the rectangular area in accordance with consistency of the calculated skew of each line.

[A5] The image extraction apparatus according to any one of [A1] to [A4] further includes a detection unit that detects skew of the detected connected pixel group with respect to the circumscribed rectangle. If the detected skew is larger than a predetermined value, the edge-pixel detection unit, the selection unit, and the rectangular-area setting unit execute processes, respectively.

[A6] In the image extraction apparatus according to any one of [A1] to [A5], the target object is a rectangular small-sheet image.

[A7] There is provided a non-transitory computer readable medium storing a program causing a computer to execute a process for image extraction, the process including: acquiring a scanned image generated by scanning a target object that is a small sheet; generating a binary image of the acquired scanned image and detecting a connected pixel group from the generated binary image; detecting edge pixels of each of sides of a circumscribed rectangle set for the detected connected pixel group, the edge pixels being detected by performing scanning operations in a direction perpendicular to the side including a first vertex, a second vertex, and a point of contact with the connected pixel group, the scanning operations being performed one by one from each of multiple points on a line extending from the point of contact to the second vertex on the side including the point of contact; selecting an effective edge pixel that is located in an outline portion of the target object displayed in the scanned image, the selecting being performed such that if one of the edge pixels detected by the edge-pixel detection unit is detected at a point farther from the side than a diagonal line of the circumscribed rectangle, the edge pixel is excluded, or such that if a distance between the side and one of the detected edge pixels that is close to the second vertex is shorter than a distance between the side and an adjacent edge pixel close to the point of contact with the connected pixel group, the edge pixel is excluded; setting a rectangular area in accordance with the effective edge pixel; and extracting an image from the set rectangular area.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
 a processor programmed to:
  set a circumscribed area that includes a small-sheet image in a first image;
  detect an edge pixel of the small-sheet image;
  determine an effective edge of the small-sheet image based on a spatial relationship between (i) the circumscribed area set by the processor and (ii) the detected edge pixel of the small-sheet image, the spatial relationship including at least one of:
   (i) a distance between the detected edge pixel and a side of the circumscribed area; and
   (ii) a positional difference between the detected edge pixel and an adjacent edge pixel;
  determine that the small-sheet image in the first image is unsuccessfully extracted based on the determined effective edge; and
  in response to determining that the small-sheet image in the first image is unsuccessfully extracted, generate a second image by combining the small-sheet image with another small-sheet image that is also determined to be unsuccessfully extracted.

2. The image processing apparatus according to claim 1, wherein the processor is programmed to:
 combine the small-sheet image with the other small-sheet image, if a distance between the small-sheet images is shorter than or not longer than a threshold.

3. The image processing apparatus according to claim 2, wherein the threshold is one of a predetermined value, a value set in accordance with a small sheet type, and a value set in accordance with a size of a successfully extracted small-sheet image.

4. The image processing apparatus according to claim 1, wherein in a case where the circumscribed area, which is a circumscribed rectangle, in the first image does not indicate a small-sheet image, the case is regarded as the case where the small-sheet image in the first image is unsuccessfully extracted.

5. The image processing apparatus according to claim 4, wherein the processor is programmed to:
 perform a determination of whether the circumscribed rectangle indicates a small-sheet image in accordance with a size of the circumscribed rectangle or a number of detected sides of the small-sheet image in the circumscribed rectangle; and
 use a result of the determination to generate the second image.

6. The image processing apparatus according to claim 5, wherein the processor is programmed to:
 when the size of the circumscribed rectangle is within a predetermined range, or when the number of detected sides of the small-sheet image in the circumscribed rectangle is larger than or not smaller than a predetermined number, determine that the circumscribed rectangle indicates the small-sheet image.

7. A non-transitory computer readable medium storing a computer to execute a process for image processing, the process comprising:
 setting a circumscribed area that includes a small-sheet image in a first image;
 detecting an edge pixel of the small-sheet image;
 determining an effective edge of the small-sheet image based on a spatial relationship between (i) the circumscribed area set by the processor and (ii) the detected edge pixel of the small-sheet image, the spatial relationship including at least one of:
  (i) a distance between the detected edge pixel and a side of the circumscribed area; and
  (ii) a positional difference between the detected edge pixel and an adjacent edge pixel;
 determining that the small-sheet image in the first image is unsuccessfully extracted based on the determined effective edge; and
 in response to determining that the small-sheet image in the first image is unsuccessfully extracted, generating a second image by combining the small-sheet image with another small-sheet image that is also determined to be unsuccessfully extracted.

* * * * *